US008473370B1

(12) United States Patent
Altendorf et al.

(10) Patent No.: US 8,473,370 B1
(45) Date of Patent: Jun. 25, 2013

(54) METHOD AND APPARATUS FOR GENERATING AN ORDER FOR PURCHASE

(75) Inventors: Mike J. Altendorf, Fort Wayne, IN (US); Larry R. Pensinger, New Haven, IN (US); Brian Scott, Fort Wayne, IN (US); Steve Coker, II, Fort Wayne, IN (US); Leroy Pierce, Harlan, IN (US)

(73) Assignee: Do It Best Corp., Fort Wayne, IN (US)

( * ) Notice: Subject to any disclaimer, the term of this patent is extended or adjusted under 35 U.S.C. 154(b) by 0 days.

(21) Appl. No.: 13/429,539

(22) Filed: Mar. 26, 2012

(51) Int. Cl.
*G06Q 30/00* (2012.01)
*G06F 17/30* (2006.01)

(52) U.S. Cl.
USPC .................. 705/26.8; 705/26.1; 705/27.1

(58) Field of Classification Search
USPC ................................. 705/26.1–27.2
See application file for complete search history.

(56) References Cited

U.S. PATENT DOCUMENTS

| | | | | |
|---|---|---|---|---|
| 2004/0003031 A1* | 1/2004 | Brown et al. | ................. | 709/203 |
| 2004/0254844 A1* | 12/2004 | Torres | ............................. | 705/26 |
| 2006/0218052 A1* | 9/2006 | Haynes et al. | .................. | 705/26 |
| 2007/0078727 A1* | 4/2007 | Spiegel et al. | .................. | 705/26 |
| 2010/0030661 A1* | 2/2010 | Friedland et al. | ............... | 705/27 |
| 2010/0325012 A1* | 12/2010 | Standish | ....................... | 705/26.8 |
| 2011/0161201 A1* | 6/2011 | Stocker | ......................... | 705/27.1 |
| 2011/0184834 A1* | 7/2011 | Perrochon et al. | ............ | 705/26.8 |
| 2012/0072304 A1* | 3/2012 | Homan | .......................... | 705/26.8 |
| 2012/0150666 A1* | 6/2012 | Savic | ........................... | 705/14.73 |
| 2012/0215656 A1* | 8/2012 | Chen | ............................ | 705/26.8 |

OTHER PUBLICATIONS

"Personalizing the user experience on ibm.com." IBM Systems Journal. 2003. 686-701. [recovered from ProQuest on Mar. 7, 2013].*

* cited by examiner

*Primary Examiner* — Peter Choi
*Assistant Examiner* — Kathleen G Palavecino
(74) *Attorney, Agent, or Firm* — Schiff Hardin LLP

(57) ABSTRACT

A method and apparatus for use by a buyer for a store includes a software application computer that is provided to the buyer at a buyer show. The application displays product features and pricing information and receives product order information from the buyer. The application displays information regarding sales of the products by the store. After completing an order, the application submits the order, and prints or transmits confirmation copies. The buyer leaves the computer the show prior to departing. A virtual shopping cart is displayed on the computer into which goods are placed prior to submittal of the order. Multiple shopping carts can be opened by the user with differing shipping priorities and different shipping destinations for each cart. Multiple shopping carts can be used while the user is browsing an on-line catalog of products to be ordered.

13 Claims, 21 Drawing Sheets

| | SKU | Model | UPC | Retail | #3 O/M | #1 O/M | Unit | |
| --- | --- | --- | --- | --- | --- | --- | --- | --- |
| | Description | | Weight | DIB | Spec/Reg | Spec/Reg | | |
| 1 | 357036 | DC825B | 886000000000 | 0.00 | 1 | 5 | EA | Qty |
| | "18V 1/4"" HEX IMPACT" | | 2.5 | 119.99 | 76.26 | 76.26 | 103.04 | History:0 |
| 2 | 366633 | D28110 | 28877523859 | 0.00 | 1 | 4 | EA | Qty |
| | "4-1/2"" GRINDER" | | 6.3 | 59.99 | 42.49 | 42.49 | 56.86 | History:0 |
| 3 | 373095 | DW368K | 28877348278 | 0.00 | 1 | 2 | EA | Qty |
| | "7-1/4"" 15A CIRCULAR SAW" | | 24.0 | 129.99 | 99.29 | 99.29 | 120.34 | History:0 |
| 4 | 30221 | C1010 | 28877553993 | 0.00 | 0 | 1 | EA | Qty |
| | 1GAL HD COMPRESSOR | | 28.3 | 0.00 | 0.00 | 88.20 | 0.00 | History:0 |
| 5 | 352807 | 352807 | 9326326511 | 0.00 | 0 | 1 | EA | Qty |
| | "8-1/4"" MITER SAW" | | 21.1 | 79.99 | 0.00 | 52.45 | 65.15 | History:0 |
| 6 | 374040 | 1/15/7700 | 80596029661 | 47.99 | 1 | 4 | EA | Qty |
| | 7.2V ROTARY TOOL | | 13.2 | 46.99 | 33.72 | 33.72 | 37.69 | History:0 |
| 7 | 338049 | FMM 250Q SELEC | 4010000000000 | 329.99 | 1 | 5 | EA | Qty |
| | MULTIMASTER SELECT PLUS | | 35.9 | 329.99 | 238.17 | 238.17 | 255.91 | History:5 |
| 8 | 324704 | RTP1000 | 8925042839 | 0.00 | 0 | 1 | EA | Qty |
| | FOLDING ROUTER TABLE | | 31.0 | 209.99 | 0.00 | 143.07 | 166.58 | History:0 |
| 9 | 337512 | HTC2000 | 813000000000 | 0.00 | 0 | 1 | EA | Qty |
| | UNIVERSAL MOBILE BASE | | 18.0 | 64.99 | 0.00 | 47.17 | 54.81 | History:0 |

METHOD AND APPARATUS FOR GENERATING AN ORDER FOR PURCHASE

BACKGROUND OF THE INVENTION

1. Field of the Invention

The present invention relates generally to a method for generating an order to be purchased, such as by a purchasing agent for a store, and to an apparatus for carrying out the method. The present method and apparatus also relates to a software application for generating an order for purchase by a purchasing agent.

2. Description of the Related Art

Many shoppers are familiar with co-operatives or co-op stores, in which several stores, often in different areas or different cities, have the same store name, or the store has the name of the co-op organization along with an owner name or other store identifier, and the stores have common or similar merchandise. Examples of co-operative stores known to many shoppers include several of the wellsqu-known regional and national hardware stores currently located in many cities. Member stores (stores who are members of the co-operative) are generally independently owned and the acquisition of the merchandise carried in the store is the responsibility of the store owner. The co-operative, who owns the name under which the stores operate, typically has control over at least some aspects of the merchandise line carried at the stores and may identify, for example, approved providers for the merchandise. Buyers or purchasing agents for the stores purchase merchandise from the approved providers, and possibly from other providers, to stock the shelves and storage rooms of the store. Some co-operative stores are owned by a common owner and so a buyer may make purchase decisions for each of the stores owned by that owner, rather than limiting the buying decisions to a single store.

The buyers should know something about the products that they are buying and should also know the sales history of the store or stores for which they are buying, such as whether a particular item or line of items sells well in their store or not. The buyers should also have an idea of the sales of the product by the store over different time periods so that the buyer can acquire items that are likely to sell at a particular time and so that they don't buy as many items when they are slow sellers or for which the current inventory is adequate.

Some co-operatives host buying shows for the buyers for their member stores. Such co-operative member shows are similar to trade shows except that the show is not open to the public but may only be attended by the buyers and representatives for the member stores. The buyers browse vendor booths at the buying show looking for items to purchase for their stores and make purchase decisions based on information available at the buying show.

A co-operative store differs from a chain store, where rather than being individually owned as in a co-operative, each store location of the chain store is owned by and operated by the parent company. Buying decisions for chain stores are generally made by a centralized group of buyers who buy merchandise for all of the stores. The purchased merchandise is distributed to the stores of the chain from the buyer's order.

When a buyer for a store is preparing an order, whether while attending a buying show or when preparing orders in the regular course of business, the buyers are often called on to prepare orders with different shipping requirements, different shipping destinations, or other different requirements. Customers of the store may ask for products on an expedited basis or may ask that large items or items not in stock be shipped directly to the customer. Preparing and organizing these different order requirements presents a challenge to the buyers.

SUMMARY OF THE INVENTION

The present invention provides a method and apparatus by which a buyer, for example a buyer for a co-operative member store, who is attending a buying show may learn of products for possible purchase by the store and may order the desired products. The buyer is presented with information about the products and may select and order items for stocking in the store for which the buyer is buying. The method includes providing a portable electronic device to the buyer while the buyer is attending the buying show, the portable electronic device including a display on which is displayed information about products presented at the show as well as possibly other items available for order for the stores. The portable electronic device may also present sales information from the store for which the buyer is buying, and preferably the sales information is broken down by item so that the buyer is presented with sales of the items that the buyer is considering. As the buyer goes through the buying show, the buyer may indicate on the portable electronic device those items and quantities that the buyer wishes to obtain for the store or stores. After completing the buy order using the portable electronic device, the buyer provides the buy order to the co-operative or other ordering entity for fulfillment of the order. The buyer may submit the buy order by returning the portable electronic device to the co-operative or by transmitting the order data to the co-operative or to another ordering entity.

In an embodiment of the invention, a software application, or "app," is provided for a portable electronic device, such as a tablet computer, that operates to provide product information and store-specific sales information for that product to the buyer and to permit input of order information for the product from the buyer. The buyer may use the app on the portable electronic device while attending the buying show to select items and quantities for the store for which the buyer is buying. The selection may be made after considering information obtained at the buyer show, sales information that is present via the portable electronic device about the items for order, and information about sales of those items by the store. The portable electronic device may also show financial information to the buyer, such as discounts, datings or other pricing and financial information that is specific to that item or to that store. The sales information and the product information may be loaded onto the portable electronic device prior to the device being provided to the buyer, or may be available via wireless transmission. The identification of the products selected by the buyer and the quantities of those items to be ordered is communicated to the co-operative as an order from the portable electronic device.

By purchasing the items in quantities through the co-operative, the stores receive a better price or more favorable terms than if purchased directly by the individual stores. These favorable terms may be displayed to the buyer on the portable electronic device as discounts or otherwise as the buyer is making the buying decisions. The collective buying power of the members of the co-operative at the buyer show permits purchases that might otherwise not be possible, such as when items are only available in quantities greater than a store would wish to order, possibly providing further discounts. Other financial information may be presented on the display as well.

Although described in conjunction with a buyer show in a co-operative business structure, the present method and apparatus may be used in other situations and business arrangements, such as buying clubs or organizations, franchise business agreements, or the like. Steps of the present method may be performed by the user at trade shows, stores, shopping malls, conventions, while considering product catalogs, including print and on-line catalogs, fashion shows, product shows, product release events, conventions, or other such events.

In a further embodiment of the present apparatus and method, a shopping cart widget or program is provided that permits the buyer to separate orders into multiple shopping carts. The different shopping carts can be used to place orders having different priorities, so that a rush order can be placed in one shopping cart while another shopping cart is for non-rush items, for example, or the shopping carts can be designated as for different departments of the store or for different shipping destinations or for other reasons. The shopping cart widget or program can run on the portable electronic device used by the buyer at the buying show, or can run on another computer device such as the buyer's office computer or portable computer.

BRIEF DESCRIPTION OF THE DRAWINGS

FIG. 5 is a screen shot of a listing of items for which orders have been entered;

FIG. 7 is a screen shot of a confirmation of the submittal of an order;

FIG. 8 is a screen shot of an order confirmation listing of products ordered;

FIG. 14 is a screen shot of showing creation of a new shopping cart;

FIG. 18 is a screen shot showing items being moved from one shopping cart to another shopping cart.

DETAILED DESCRIPTION OF THE PREFERRED EMBODIMENTS

Figure 1:
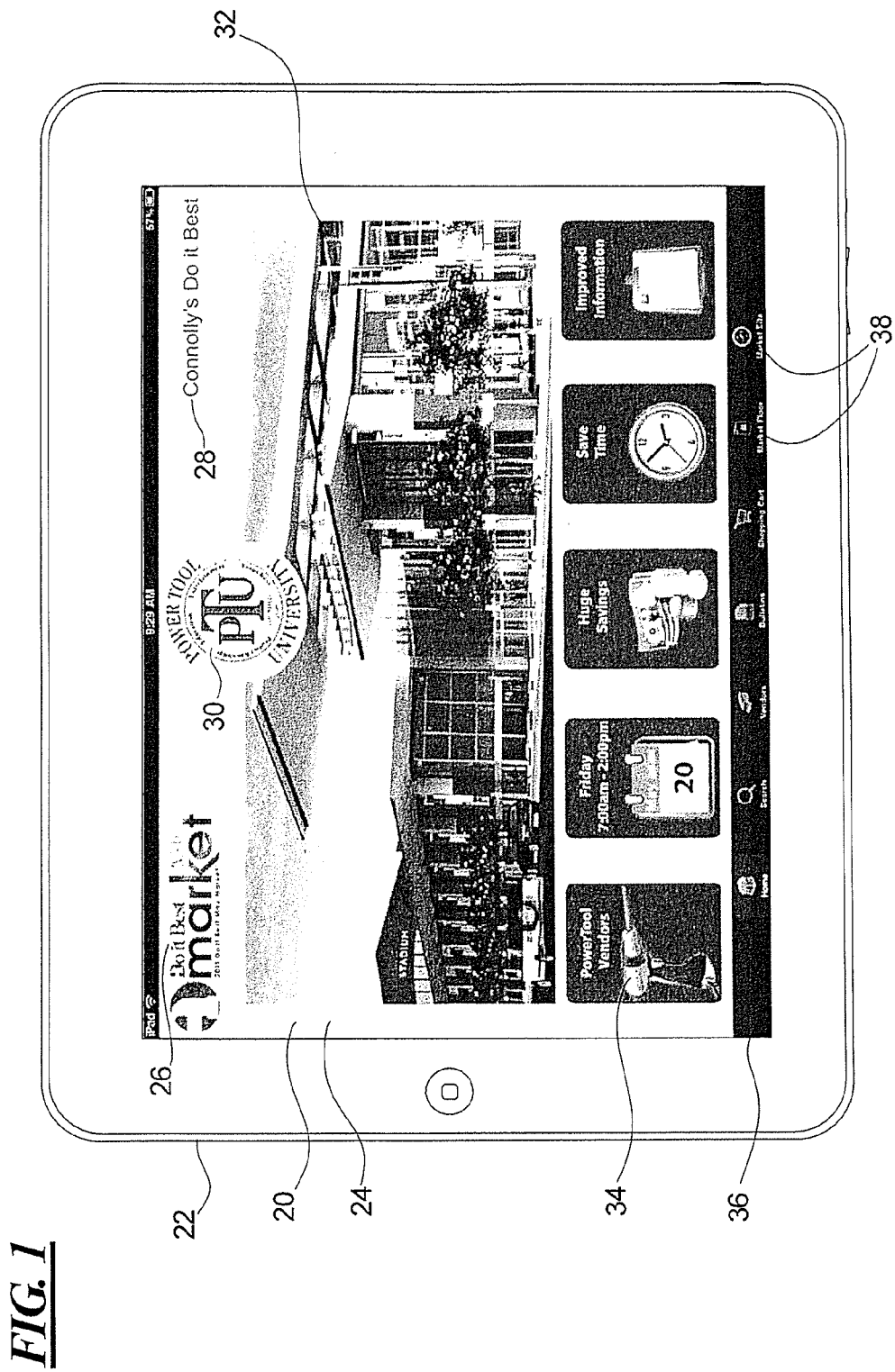
FIG. 1 is a screen shot of a master screen of an app, or software application, running on a tablet computer according to the principles of the present invention.

A method and apparatus are provided as shown in an exemplary embodiment in FIG. 1. The illustrated embodiment includes an application 20 operating on a tablet computer 22 which has a touch sensitive display 24. In the illustrated embodiment, the tablet computer is an Apple iPad™ tablet computer, although other tablet computers as well as other portable electronic devices can be used. As is understood by those of skill in the art, the tablet computer 22 of the present example includes a power button, volume control buttons, a home button, a headphone output connection, data and power connection port, camera and video capability, as well as wireless communication links, such as WiFi, mobile phone, and Bluetooth connectivity. The tablet computer 22 has a processor that executed software including software stored on tangible, non-transient computer readable memory within the computer. A battery is provided within the tablet computer 22 although the computer can also be powered by line power.

Examples of other portable electronic devices that may be used in conjunction with the present apparatus and method include other tablet computers, smart phones, personal digital assistants (PDAs), portable music systems (such as an Apple iPod™ music system), netbook computers, notebook computers, laptop computers, e-book readers, and other devices without limitation. It is envisioned that the method and system, or aspects thereof, could be provided on a desktop computer, workstation computer, kiosk, server computer, or other computer device, whether such devices are portable or not portable.

The application may be presented to the user as an icon or other symbol on the computer display that is activated by being selected by the user. Alternatively, the computer device may be provided to the user with the application already started on the device. The software application operates under the iOS operating system as used by the Apple iPad tablet computer. Other operating systems are possible, including Windows, Android, Linux, etc. In the exemplary embodiment, the software application and the data used by the application are loaded onto the tablet computer so that the application can be used in stand-alone mode without active access to outside communication channels. Of course, it is also possible that the application and/or data can be received from a source outside the electronic device.

In FIG. 1, the display 24 of the tablet computer 22 shows the home page of the application after the application has been started. The name 26 of the co-operative is provided in the upper left corner of the display while the name 28 of the store or member is provided in the upper right corner. A logo 30 for the buyer show is provided, the illustrated application having been customized for use at a buyer show providing a focus on power tools. An image 32 of the show location is provided below the logo 30. The lower portion of the display includes a row of icons 34 by which the user can activate functions in the application, such as by tapping an icon 34 on the touch sensitive display. The illustrated icons 34 include an icon providing access to a listing of power tool vendors, an icon providing information on the time and date of the buyer show, an icon presenting purchase options that provide a financial savings to the buyer, an icon presenting options that provide time saving hints, and an icon providing information for the buyer.

At the lower edge of the display is provided a navigation bar 36 that includes a number of small icons 38. The small icons 38 include a home icon by which the user navigates to the home screen display as shown in FIG. 1. Other small icons 38 include a search icon, a vendor icon, a bulletin icon, a shopping cart icon, a market floor icon and a market site icon.

Figure 2:
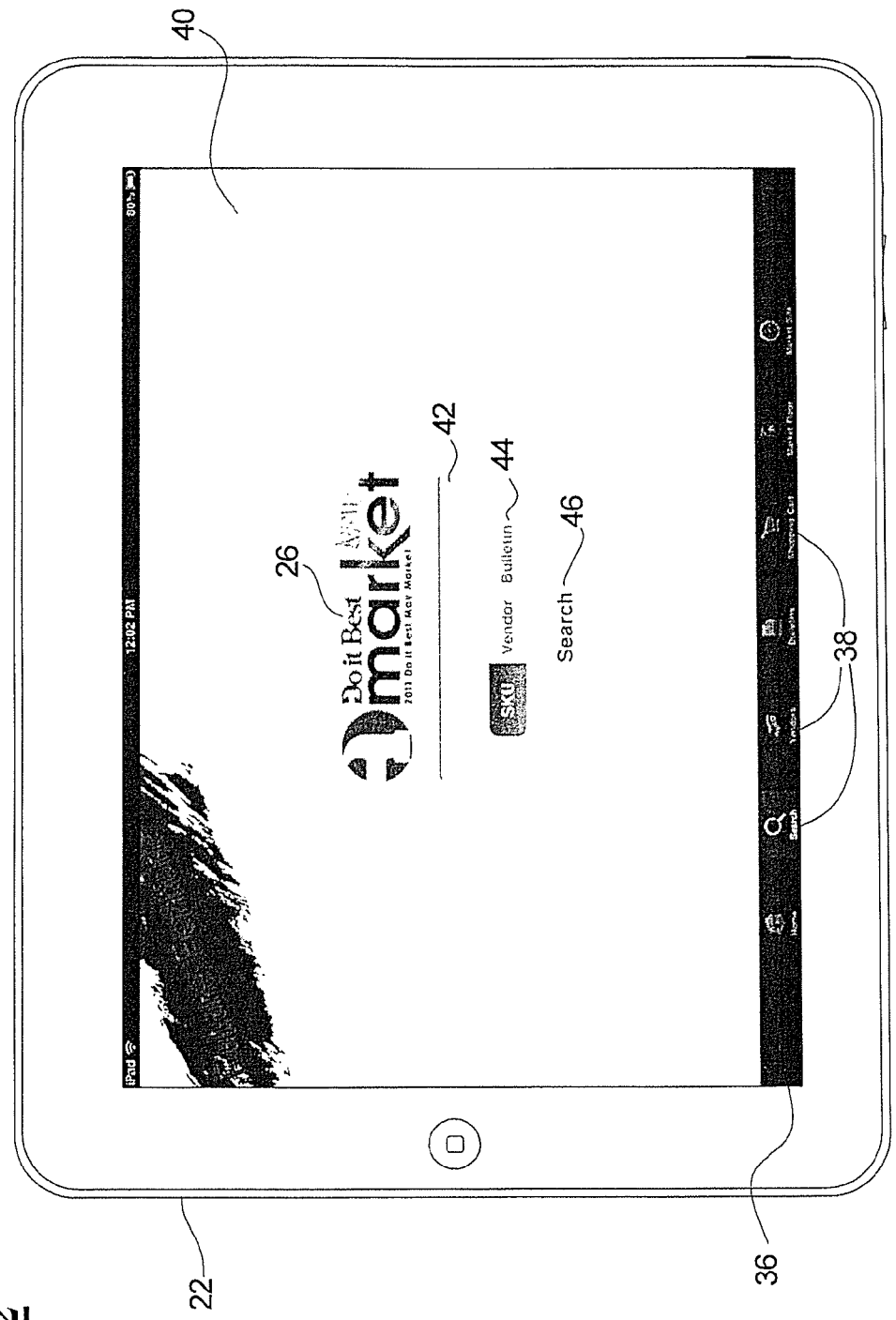
FIG. 2 is a screen shot of a search screen of the app that permits the user to locate items, vendors or bulletins.

By selecting the search icon 38, the user is taken to the search screen 40 as shown in FIG. 2. The search screen 40 includes the membership information and a text entry box 42 into which the user may enter search terms. The search screen permits the user to search for product information, also termed bulletins, using various criteria, including by SKU (stock keeping unit), by vendor or by booth number, as selected by the selection buttons 44. The search function is initiated by the search button 46. The user can thereby search for products, for vendors or for booth information at the buyer show. Note that the navigation bar 36 and small icons 38 remain on screen when the search screen 40 is displayed.

Figure 3:
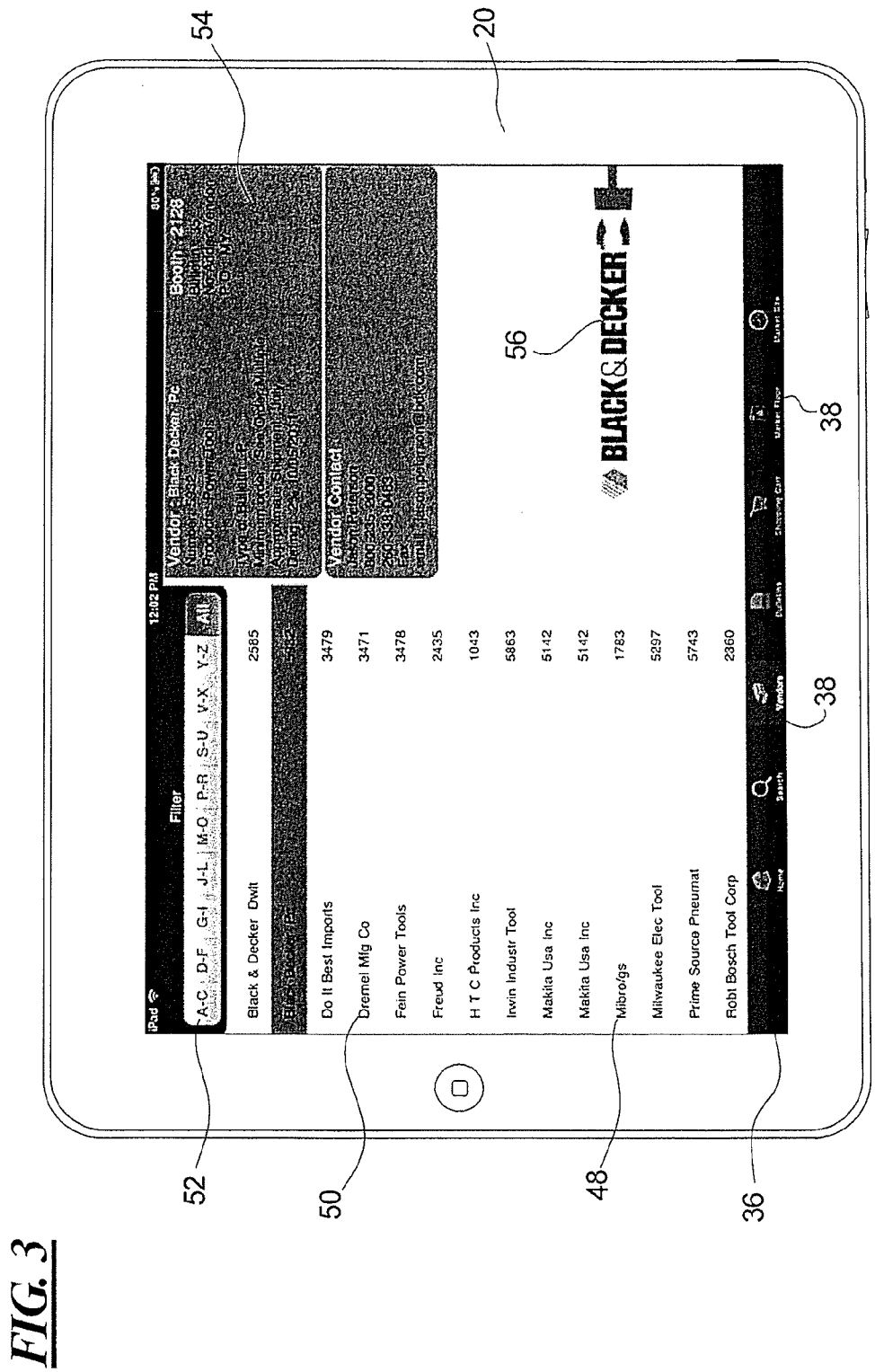
FIG. 3 is a screen shot of vendor information screen.

Turning to FIG. 3, when the user selects the vendor's icon of the small icons 38, the display changes to a screen 48 showing basic vendor information. Vendors that offer products that the user may wish to purchase for the store are listed 50 in order, here in alphabetical order, on the left portion of the display. Above the list 50 is a row 52 of segmenting buttons by which the user may display only segments of the vendors in the vendor list 50. Here, the segmenting buttons break the alphabet into nine segments, with a tenth button provided for displaying all segments. When a user selects a vendor, such as by tapping on the screen over the vendor's name in the list 50, the selected vendor list is highlighted and an information window 54 opens to the right side of the display 20. The information window 54 shows basic vendor information, including contact information, vendor booth number at the buyer show, etc. and presents a preview of the product bulletin for that vendor's products. The selected vendor's logo is displayed at 56. The user can thereby review information for each vendor. The listed vendors may be limited to those at the buyer show, or may include all approved vendors by the co-operative, or may include other vendors. Here, the small icons 38 remain on screen.

Figure 4:
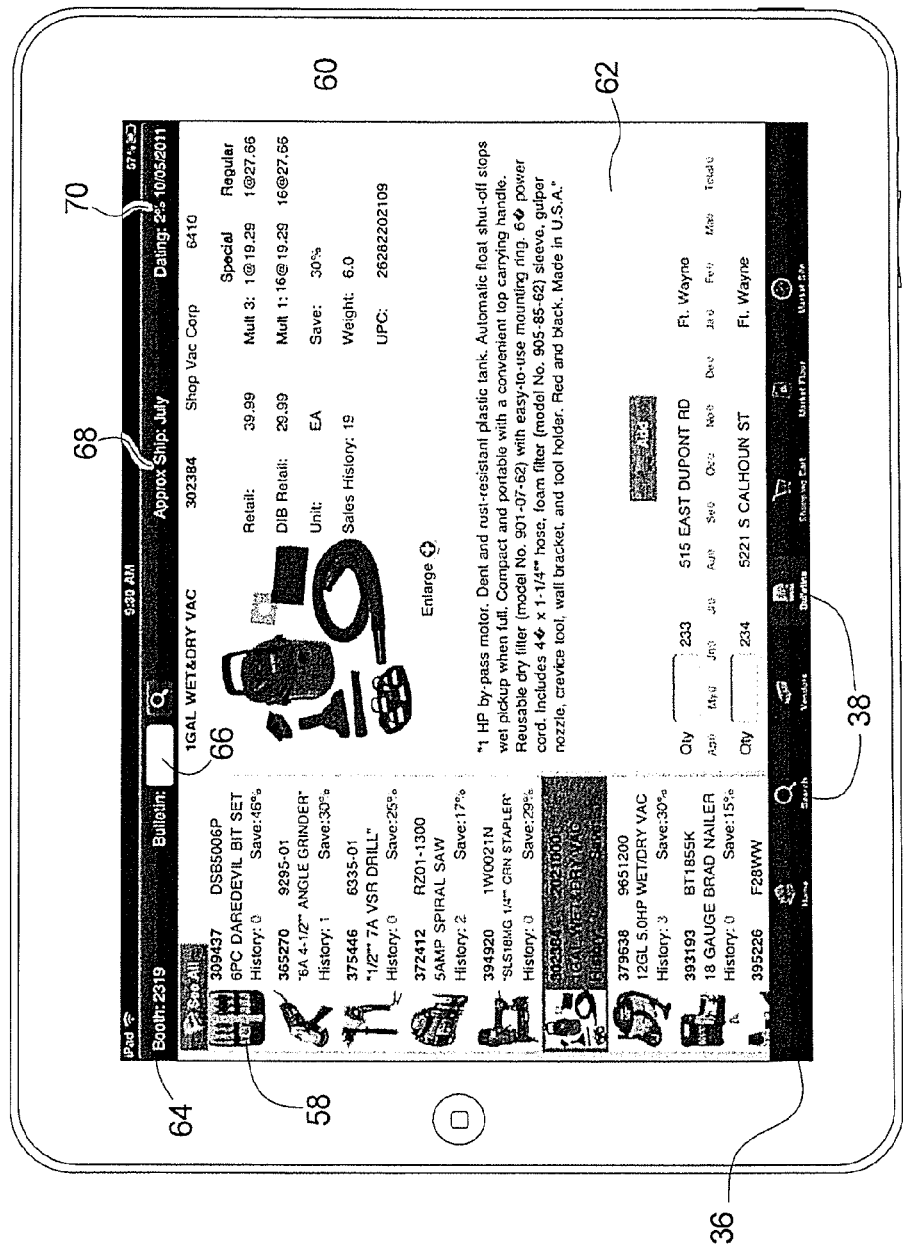
FIG. 4 is a screen shot of a product information screen including input spaces for ordering the selected product for two stores.

FIG. 4 shows the bulletins that include information on the products. A bulletin within the context of the present invention is a product information document that includes store cost information. The bulletins serve as order forms for the products, and may include cost, dating terms, approximate delivery dates. In particular, a list 58 is provided on the left side of the display of products available for purchase from the selected vendor. A brief amount of information is provided in the list 58. A user may select an item from the list 58, which causes the selected item to be highlighted and a bulletin 60 containing further information about the item opened in the right ⅔rds of the screen. The bulletin 60 includes more detailed information on the selected product. Here, a wet and dry vacuum is shown with information on the price, sales history, shipping weight, product code, and product description. The sales history information is the sales history of the store or stores for which the buyer is buying. At the bottom of the bulletin 60 is an order entry location 62 that include a quantity entry box for each store as well as store number and store address information for the store. Here, the buyer is buying for two stores. A quantity of the product can be ordered for each store by entering a number in the quantity box for the respective store. The order entry portion may list as all the stores for which the buyer is responsible. For example, the user may swipe a finger on the touch screen to reveal listed stores that are off screen in the illustrated view. The order entry location 62 also includes a 12 month quantity breakdown showing quantities of the selected item sold by the store. A monthly sales breakdown for the product is provided for each listed store. The information on sales for the store, as well as other information displayed, may be already loaded onto the tablet computer when it is picked up by the user or may be loaded wirelessly as needed while the user accesses various screens of the app. The small icons 38 appear at the bottom of the screen to permit user navigation to other areas of the app.

At the top of the screen of FIG. 4 is information on the booth number 64 of the booth at the buyer show where the displayed products may be examined, a search entry box 66 at which the buyer may search for product bulletins. Also on the top portion of the screen of FIG. 4 is information 68 on the approximate shipping date for the ordered products. The buyer can ensure that needed products will reach the store on time. At the top right corner in this view is an indication 70 of payment terms that accompany this order. For the illustrated example, the payment terms are a 2% discount for payments made by a certain time. The percentage discount is applied to the purchase price if the payment for the order is made by a payment deadline. These favorable financial terms may be specific to the member store or may apply broadly to all orders of this product or to orders from this vendor, for example. Other financial terms may be presented to the buyer as well.

With reference to FIG. 5, a page view of a bulletin or product listing 72 is presented without the item images and descriptions, but including information such as the SKU, model number, UPC, pricing information, and unit size. A buyer who is familiar with the products and does not need the descriptions may choose to use the screen of FIG. 5. Orders for the items are entered into quantity boxes 74 at the right side of the list 64. The top of the quantity boxes indicates the store number 76 of the store and other store information for which the order is being placed. Store sale history information 78 is provided for each item immediately below the quantity entry box 74. In this example, the sales history information is for a 12 month span covering sales of that product by that store. The buyer can thereby determine how well a particular item sells in each store and base orders for further quantities of the item on the sales history. Other sales information may be provided on the screen as well. On this screen as well as in others, the user may scroll the view to see portions of the display that are not currently visible on the screen, such as by swiping their finger on the touch screen. For example, by swiping a finger on the display screen, the user may cause the displayed listing of FIG. 5 to move upwardly, revealing further listed items below the displayed items.

Figure 6:
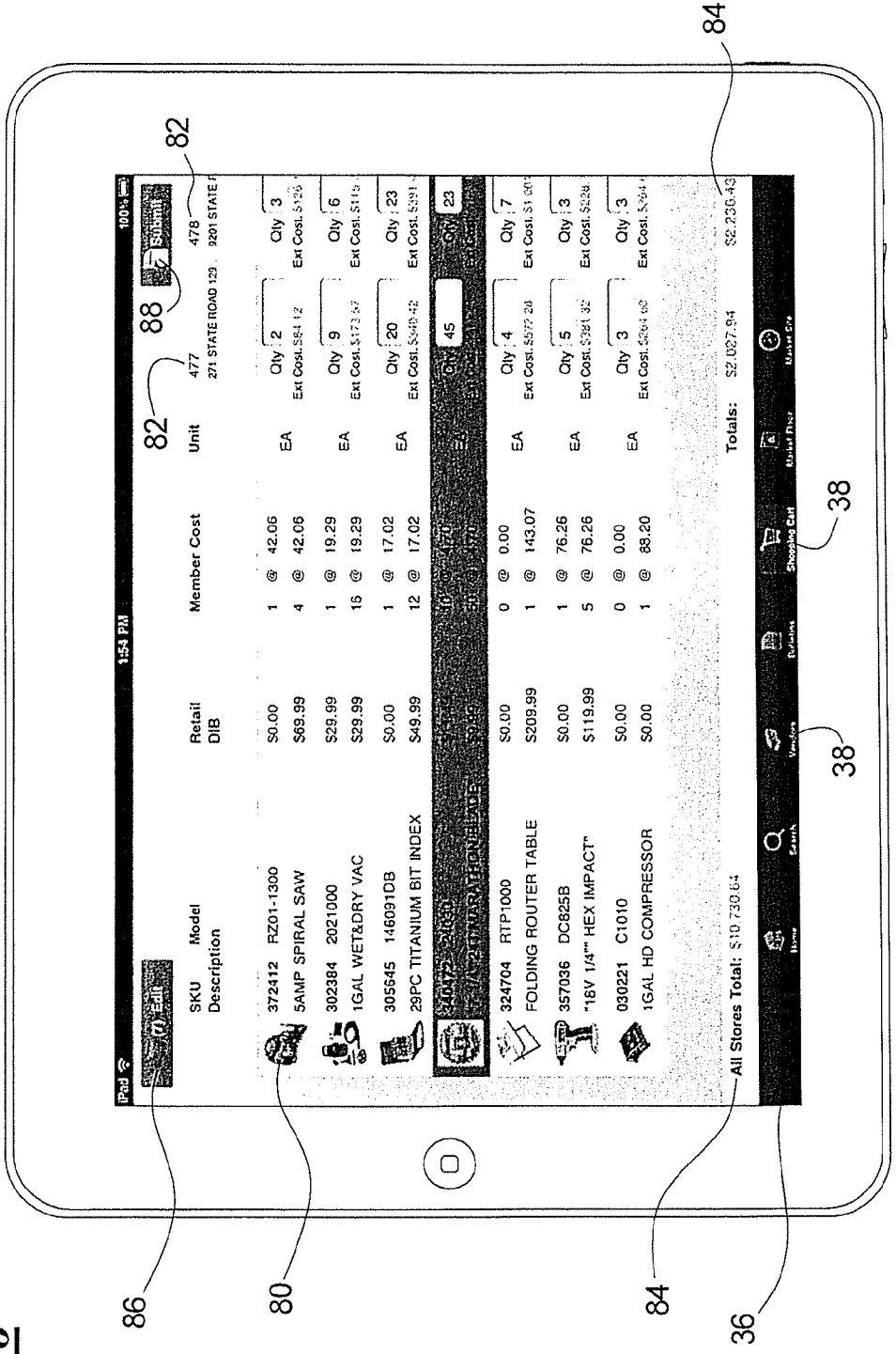
FIG. 6 is a screen shot of the contents of a shopping cart showing items for purchase by the buyer.

Turning to FIG. 6, a user has selected the shopping cart icon 38 in the navigation bar 36 as a result of which the display shows the shopping cart list 80. The shopping cart list 80 includes item information for each item for which a quantity has been entered by the buyer in an order screen. The item information includes SKU, model number and description, along with pricing and cost information. The buyer in the illustrated example is ordering for two stores, so there are two store columns 82 that show the quantities of the listed items for each store. For instance, the highlighted item is a 7¼ inch saw blade. The buyer is ordering 45 such blades for store number 477 and 23 blades for store number 478. Below each quantity box is an ext. cost value. At the bottom of the screen are shown totals 84 ordered for all stores and totals 84 for the individual stores. At the top of the screen is an edit button 86 that permits the user to edit the selected entry, for example to change the quantity ordered. After the buyer has reviewed the order by examining the contents of the shopping cart, the buyer may select the submit button 88. The submit button 88 operates to wirelessly transmit the item and quantity information to an order receiving entity. The order receiving entity can be the co-operative, the vendors, an intermediary, or some other entity.

Figure 7:
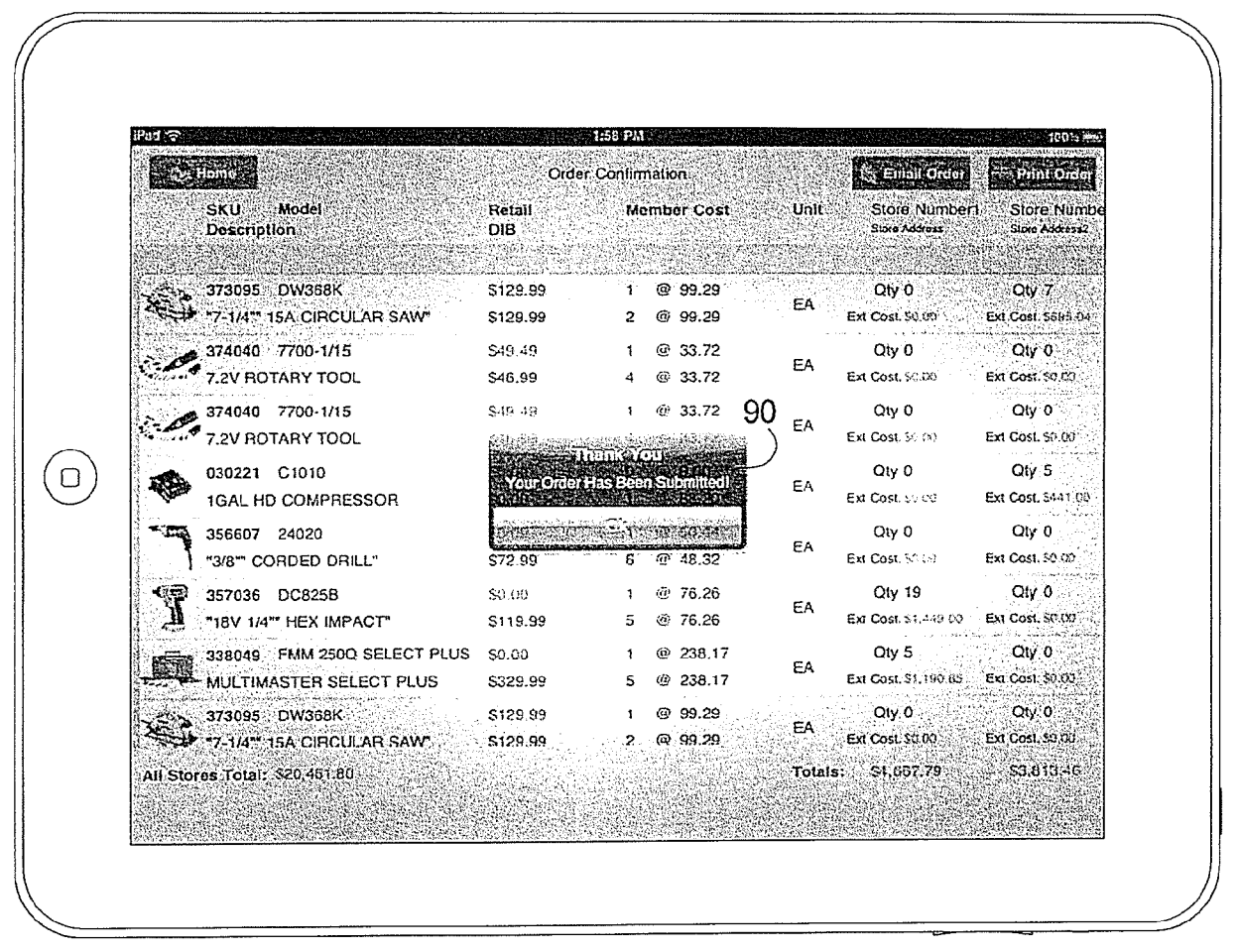

In FIG. 7, the user has selected the submit order button 88 and a confirmation window 90 appears. If the order is acceptable to the buyer, the user taps the "OK" button, which results in the order being submitted. The order can be submitted either wirelessly or via a wired connection over an available communication channel to an order receiving entity. In the preferred embodiment, the order is communicated via the Internet. The submitted order can include all or only part of the items selected and provided with a quantity by the user on the order form. The submittal of the order information should be error free, so that error checking processes and codes may be used to ensure that the order sent is the order received.

Figure 8:
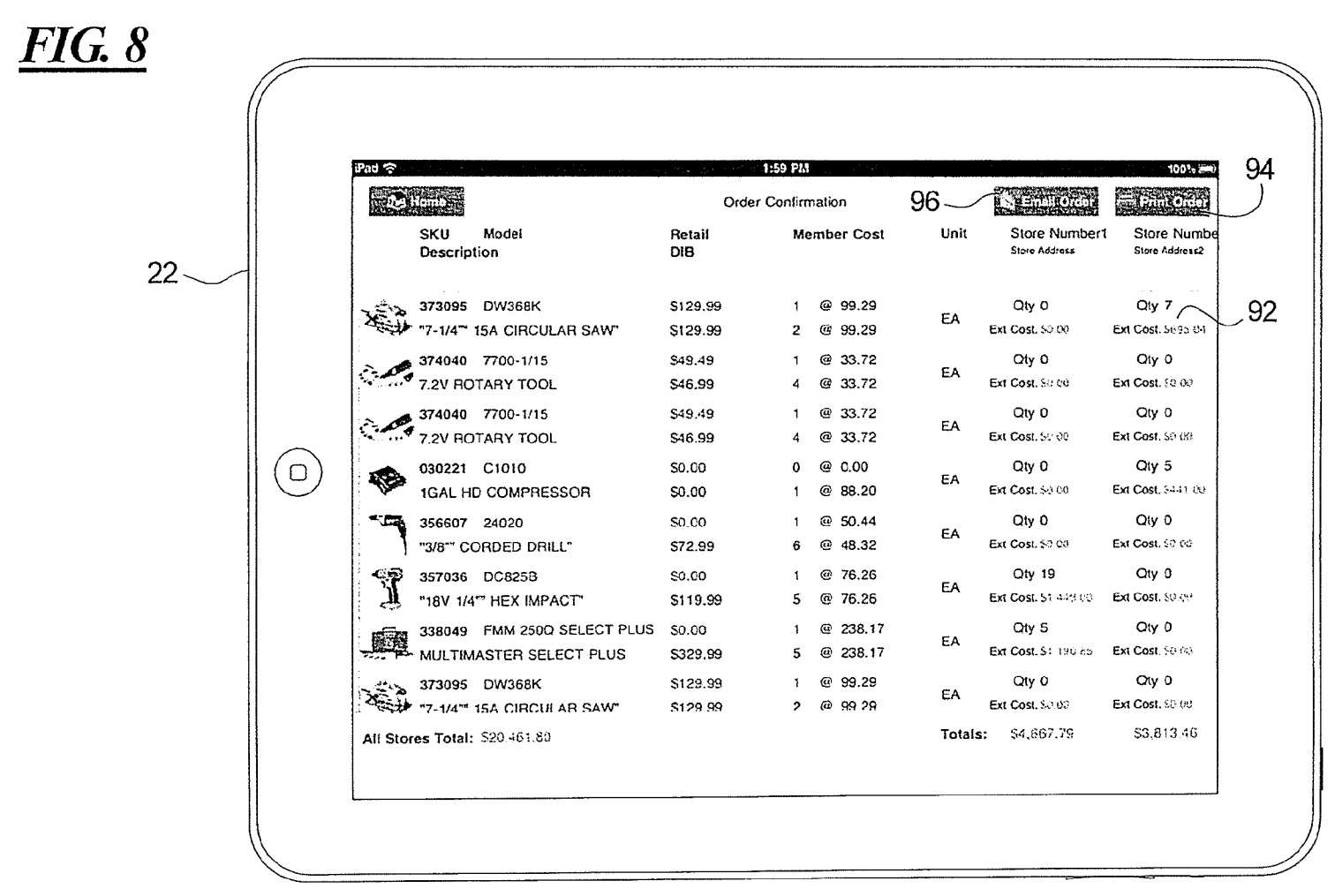

The screen shot of FIG. 8 is an order confirmation page 92 that lists the items that have been ordered in the ordering process. Not only does the order confirmation screen 92 permit the user to review items that have been ordered, but the confirmed orders can also be transmitted from the tablet computer 22. For example, a print order button 94 is provided by which the confirmed order is printed on a computer printer. In the preferred embodiment, the print command is transmitted wirelessly from the tablet computer 22 to a wireless printing facility, such as a wireless printing facility at the buyer show. The user may be asked to print at least two copies of the order. If desired, the user may also transmit the confirmed order to an email account, by selecting the "e-mail order" button 96, the order is transmitted to an e-mail account so that it can be viewed or stored. The print and e-mail buttons 94 and 96 may cause further dialog boxes to open, such as to permit the user to select a printer or an email account, if one has not already been designated as a default.

According to the present method, the tablet computer 22 is returned by the user to the operator of the buyer show or other entity, the result of which is that the user cannot later use the tablet computer to view the order. For this reason, the print out or electronic copy of the order transmitted from the tablet computer 22 become important to the user.

Figure 9:
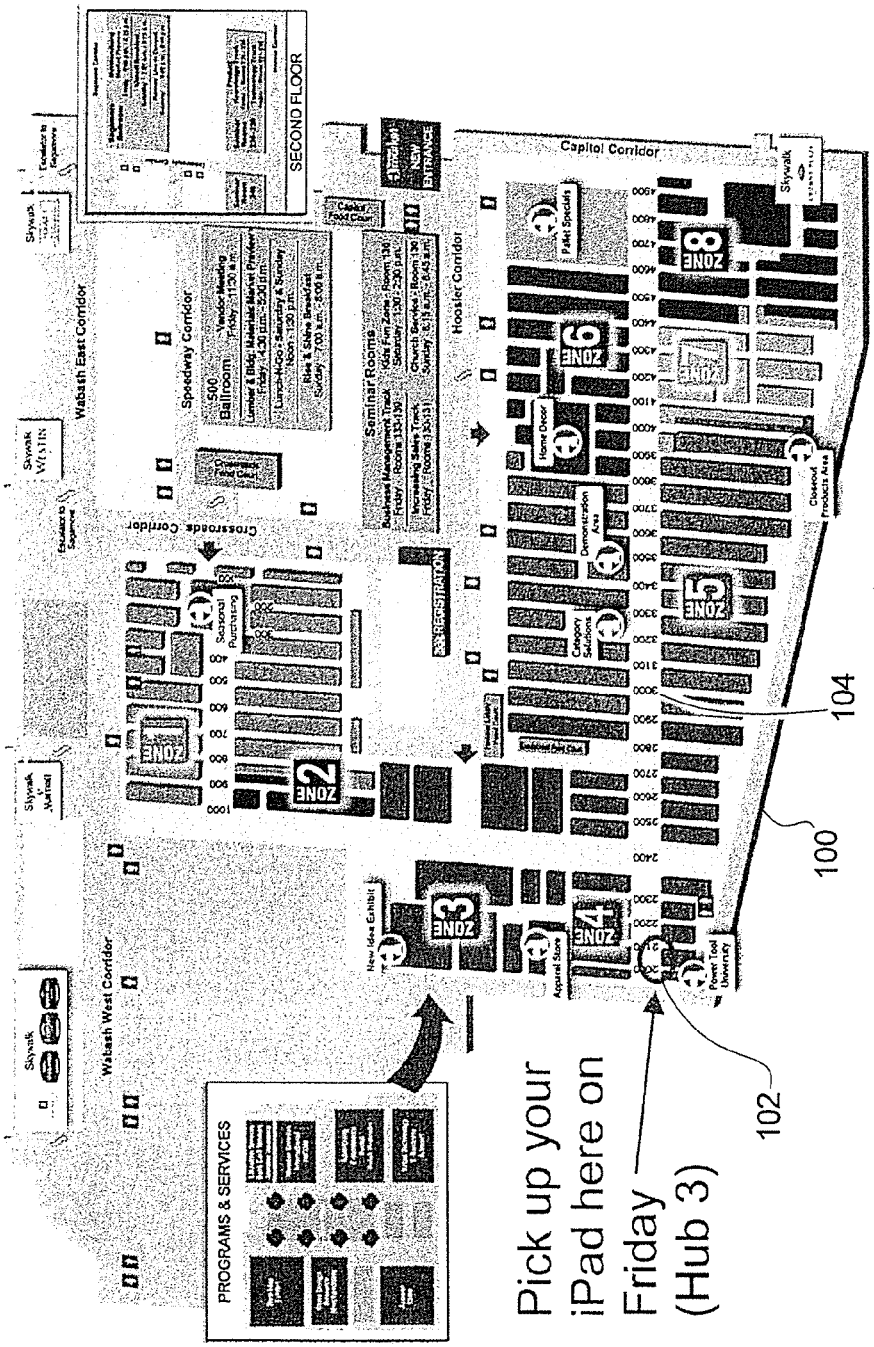
FIG. 9 is a floor plan of a buying show for attendance by buyers of the member stores, showing the locations of vendor booths at the buyer show and indicating the location for the buyer to pick up a portable electronic device by which to place orders while at the show.

In FIG. 9, a layout or floor plan 100 of a buyer show is provided. The participants in the buyer show are buyers for member stores who are tasked with purchasing items to stock in their respective stores. The buyers are instructed to pick up a tablet computer at a pick-up area 102. The tablet computer, such as the tablet computer 22 shown in the prior figures, has loaded thereon an application, or app, that presents information to the buyer about products and producers at the show, as show for example in the foregoing figures.

As the buyer moves about the show to the various booths, tables, displays and informational area, the information at the show is tied to the information presented by the app on the tablet computer. For example, the booths and displays may have booth numbers 104, as marked on the floor plan 100, that are keyed to the booth number display 64 shown on the display screen for example in FIG. 4. The booth numbers 104 are preferably marked on the booths as well. The buyer may enter a booth number or a vendor name or other information, learn more about the products displayed at the booth or which are available from the vendor sponsoring the booth, including product pricing, whether there is a discount for ordering certain quantities of the product, etc. The buyer can easily enter ordering information into the app on the tablet computer while at the buyer show. After completing the order to the buyer's satisfaction, the buyer submits the order wirelessly from the tablet computer while still at the show. The buyer may be directed to a printing area of the show so that the buyer can print out one or more paper confirmation copies of the order. As noted, the buyer can also forward the completed order via electronic mail to his or her own email account or to the store email account or other email account using commands in the application. Prior to leaving the show, the buyer is asked to leave tablet computer with the show personnel. If there is any problem with the order submittal, the computer can be checked for order details.

As is apparent from the floor plan 100, the buyer show is laid out by in zones or areas relating to different vendors, product types, special purchases, demonstration areas, or in some other way. As the buyer moves through the different areas of the show to look at products, the buyer can see the products offered by those vendors or in those areas of the show. The buyer is provided on the tablet computer with the sales information for those products over various prior time periods from the store or stores for which the buyer is buying. The buyer is therefore well informed about the products needed by the store and about those products that sell well or that don't sell as well for the store for which they are buying. By receiving the directly entered ordering information from the buyer into the tablet computers, the need to have paper order forms transcribed is eliminated, saving time and reducing the chance for errors. By providing the app or application on a tablet computer offered by the show personnel, the show personnel is able to ensure that the application runs well on the computer being used by the buyer at the show and that the computer has the necessary version of operating system, communications software and hardware and other features that permit the application to run well, display ordering information, upload ordering information and with few if any problems.

It is foreseeable that a locating device on the tablet computer may be used to locate the buyer and the computer within the show to thereby display the product information for booths at that location. The locating device may be used to insure that the tablet computer does not leave the show without authorization. Locating devices such as RFID, GPS, optical or radio frequency coded devices, or other such devices may be used for this feature.

It is also foreseeable that the buyer may bring a computer device to the buyer show and that the application, or app, is loaded onto the computer device either before attending the show or at the show. The proper operation of the application on the computer device and the error-free submittal of the order from the computer device become important.

It is also foreseeable that the application or app may be used by the buyer at a location other than the buyer show. For example, the buyer may purchase items for the store while at the store, or at some other time or location. The scope of the present application is not limited to buyers attending a buyer show, but extends to other times and places. For example, the user may use the present method and apparatus while browsing a store, while browsing an on-line or print catalog, or at some other time.

Figure 10A:
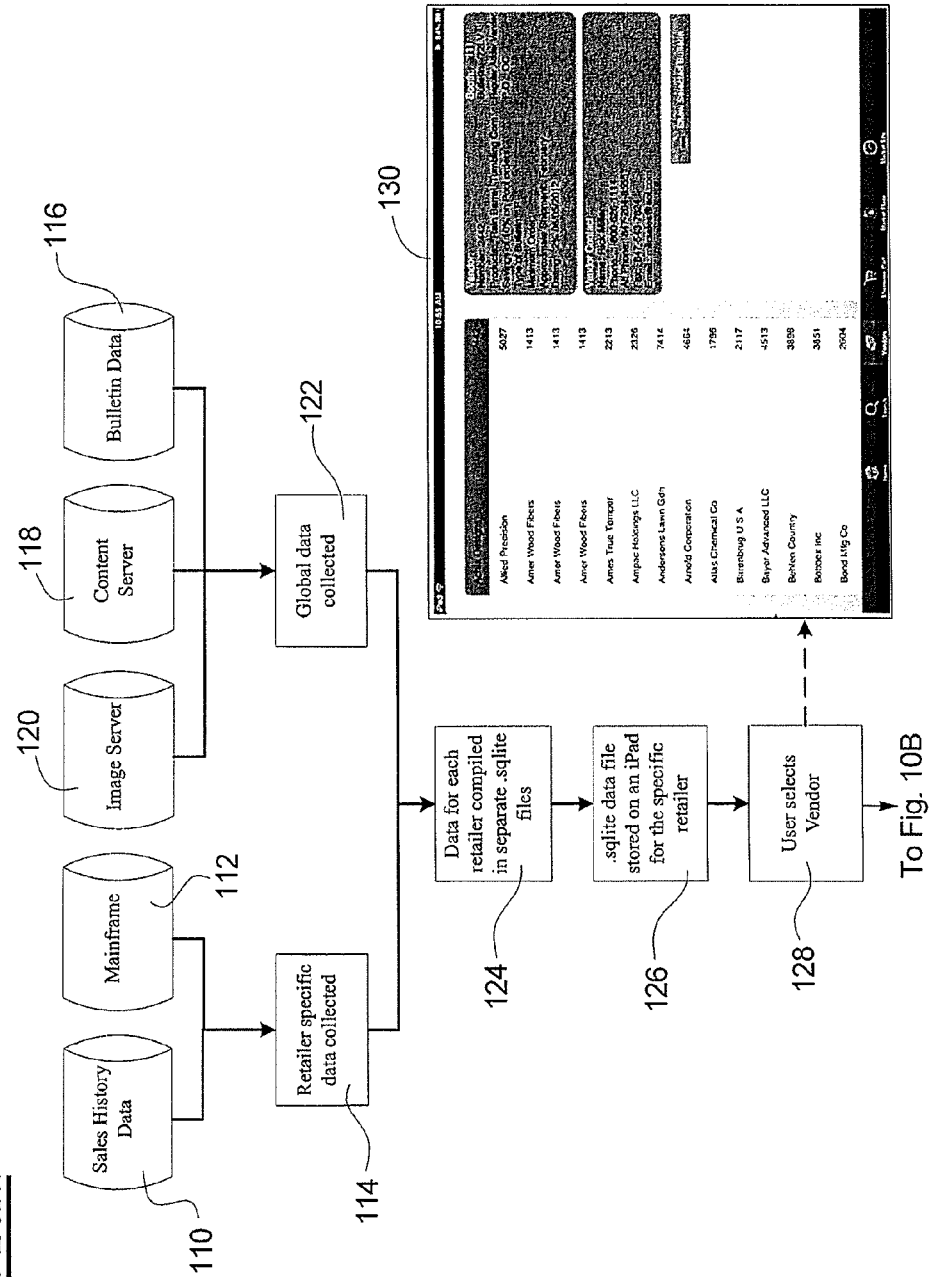
FIGS. 10A, 10B and 10C are portions of a flow chart illustrating an embodiment of the present method.
Figure 10B:
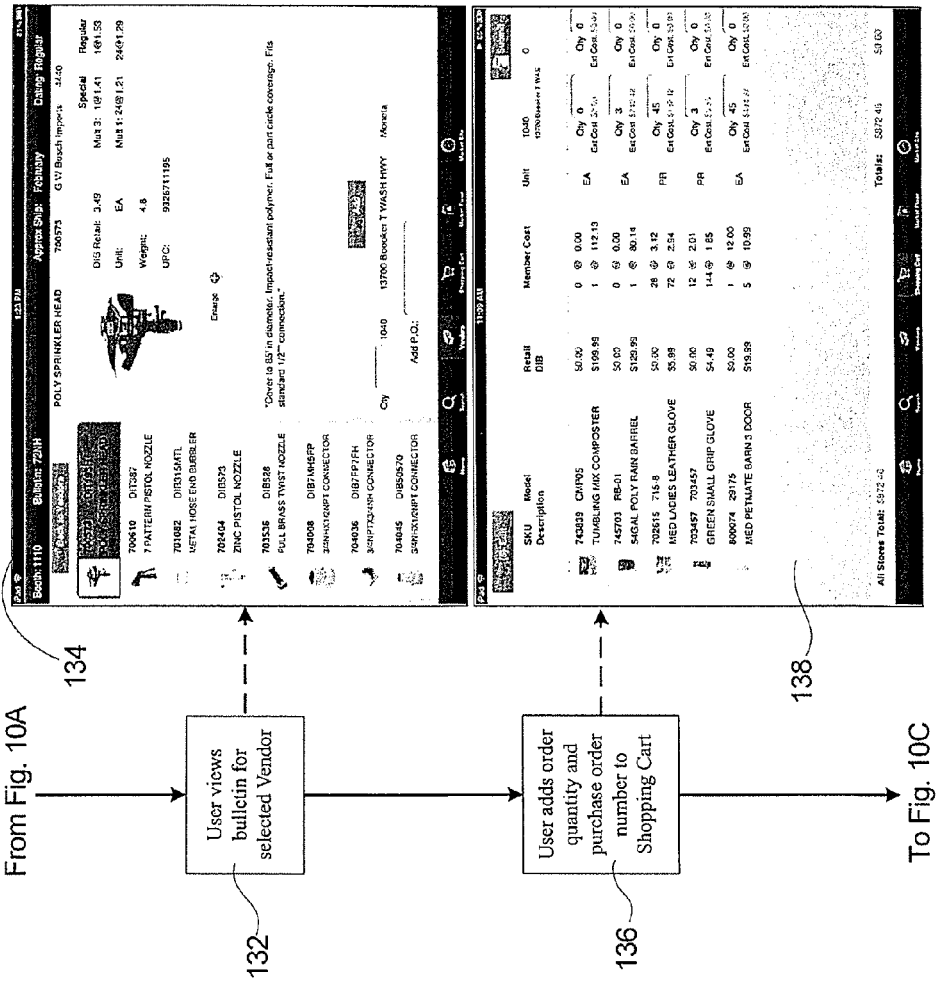
Figure 10C:
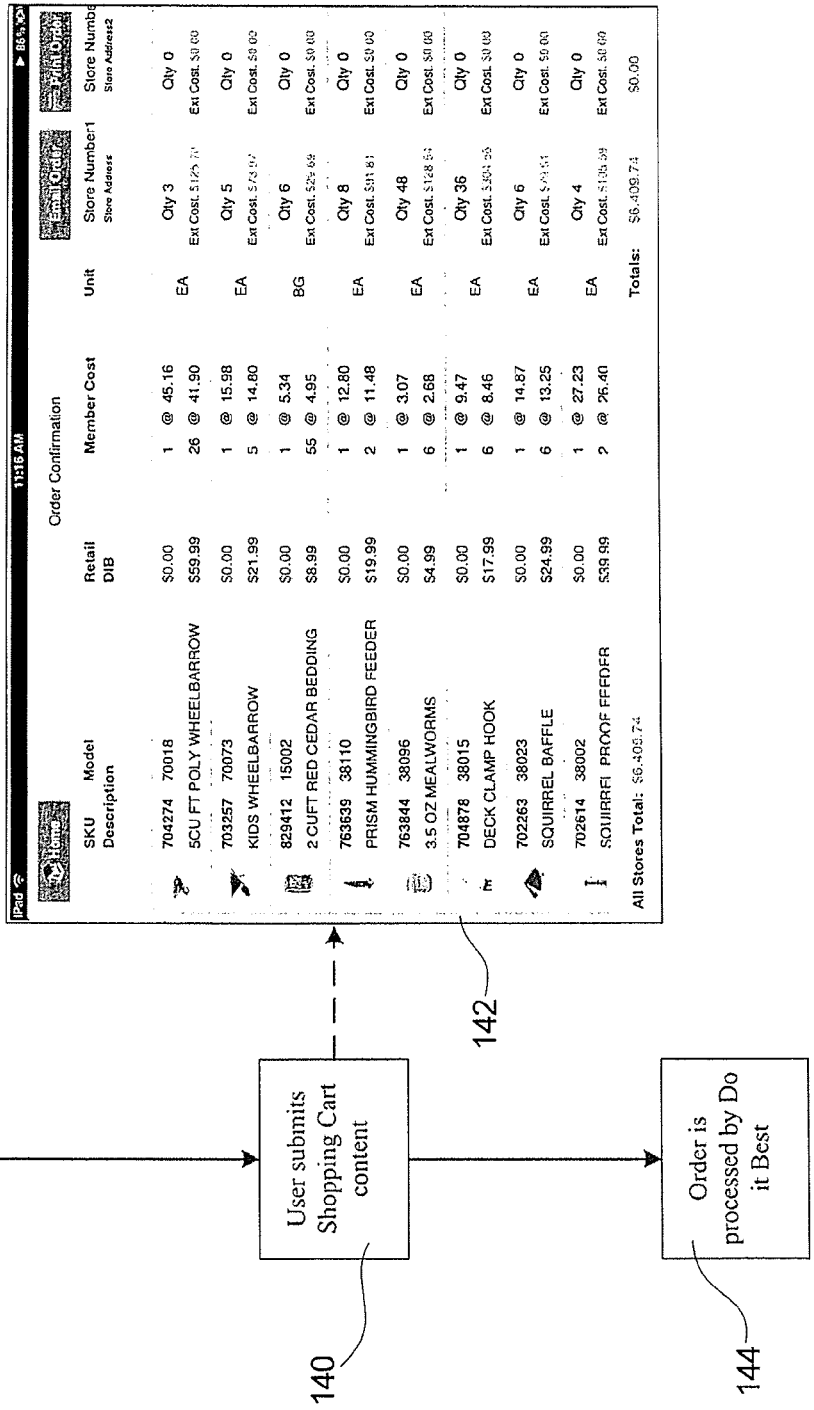

In the flow chart of FIGS. 10A, 10B and 10C, stored data is used in the present method. For example in FIG. 10A, sales history data 110 for the retail stores under the membership agreement is stored on a computer readable media, such as a computer hard drive, tape drive or solid state memory or other storage media that is accessible by a server or other computer device. Data relating to the individual stores, including retail store location, address, store number, buyer or representative, store owner, and other information is stored on a computer readable storage media 112 that is accessible by a mainframe computer. The sales history data 110 and the retail store data 112 from the mainframe computer are combined to provide retailer specific data at 114.

In a separate branch of the process, bulletin data 116 that includes product information is read from a computer readable storage media along with content data from a content server 118 and image data from an image server 120. The image data, content data and bulletin data are combined to provide global data at 122. The global data 112 includes data and images that are specific to products that the user may purchase for the store or stores.

The retailer specific data 114 and the global data 122 are combined at step 124 to generate separate database files for each retailer. The files can be broken down into separate files for each retail store or the stores that are commonly owned can be grouped together. The database files are preferably of a type that can be accessed using a tablet computer device. In the preferred embodiment, the retailer files are .SQLite files, a self-contained database engine and file that can be accessed by browser software, for example. In step 126, the database files are loaded onto and stored on tablet computers, each tablet computer receiving the files for a separate retailer. The tablet computers also include the app, or application program, by which the information in the database file is accessed by a user.

The pre-loaded tablet computers are taken to the buyer show and distributed to the buyers for the respective retail stores, for example as the buyers enter the show. It is also foreseen that the tablet computers may be provided to the buyers before the show or after the buyer arrival at the show, such as after an orientation session. Once the tablet computer is in the hands of the buyer at the buyer show, the buyer, or user, operates the app to select a vendor at step 128 for products about which the buyer has an interest. Selection of a vendor at 128 opens a display 130 on the tablet computer that lists the vendors for the buyer show. Other vendors may be listed as well. In the illustrated example, the vendors are listed alphabetically on the left of the display screen 130 and detailed information on a selected vendor is provided to the right side of the display 130. The display screen 130 includes the navigation buttons and other features described above.

Once the user has selected a vendor for products to be reviewed and possibly purchased for the retail store, the user or buyer operates the app to select a bulletin at step 132 from the selected vendor. Selection of the bulletin at 132 opens the bulletin display 134 on the tablet screen. The bulletin display 134 includes a list of products by the vendor for which bulletin information is available. Selection of one of the bulletins opens the bulletin information window, in which is shown information about the product, pricing information for the retail store such as purchase price, retail price, discount information and other information that may be relevant to the buyer's decision. Information on the retail store for which the buyer is making the purchases is also included, including store number and address. Sales information for the selected product in the displayed retail store may also be presented. A quantity box is provided in the display 134 in which the buyer enters a quantity of the products that are being purchased for the retail store.

The user views bulletins for different products from the same vendor and from different vendors, entering quantity information as desired.

In step 136, the user or buyer has entered quantities for products into the display screen of the app running on the tablet computer, such as while at the buyer show. The entered quantities constitute a purchase order, which is assigned a purchase order number, such as by the app or from another source. The user selects a command to add the order quantities and the purchase order number to a shopping cart. The shopping cart is a listing of items and quantities and prices for which the user has indicated a desire to purchase, as shown at 138. Items in the shopping cart can be reviewed by the user. The user may edit the shopping cart to remove items, change quantities, add items or make other changes. Once satisfied, the user submits the list of items in the shopping cart by pressing the appropriate button or command.

After the user selects the submit command at 140, a confirmation of the order is displayed at 142. The confirmation may be printed and/or transmitted by email, as discussed above. After the confirmed order is finished, the order is processed by the company, as indicated at step 144. The processing of the order includes having the ordered items shipped to the retail stores for which the order was placed. It is also possible that the orders for several buyers attending the buyer show are collected and a large shipment of the products is made to a distribution center and then the large shipment is broken up and sent to the individual stores that ordered that product. It is preferable that multiple such distribution centers are provided. As items at the store are sold, the sales information for the products is updated in the sales history server 110 (FIG. 10A) so that further consideration of purchases of the products include up-to-date sales information for the retail store.

In another aspect of the invention, a shopping cart widget or program is provided. The shopping cart widget can be used on the tablet computer 22 as the buyer shops the buyer show or may be used by a user on a computer while shopping in a catalog of products, either on-line or in a stand-alone mode. In one embodiment, the shopping cart program is available to the user during shopping of web-based, on-line product catalogs. The device on which the shopping cart program is used may be a desktop or laptop computer, workstation, kiosk, tablet computer, netbook computer, notebook or netbook computer, smart phone, e-book reader, music player, or other such device. The shopping cart program may be resident on the computer device or it can be available only when the computer device is connected to a portal, such as via an Internet connection. The shopping cart program may run within an Internet browser program or under some other program or may run independently. Although described in conduction with a buyer purchasing products for stocking a store, the shopping cart program of the present invention has application in a variety of situations by a variety of users, each of which is encompassed within the present invention.

Figure 11:
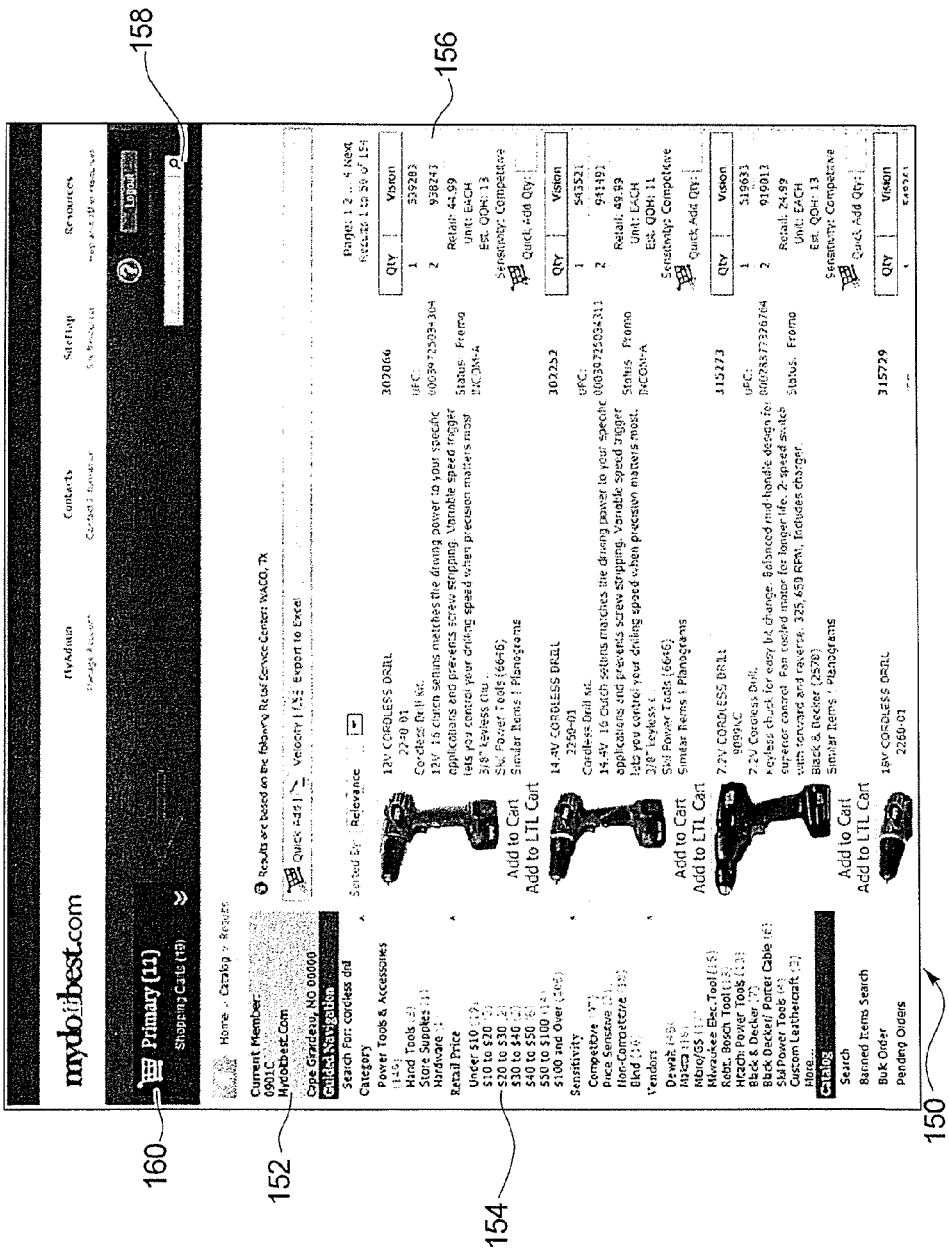
FIG. 11 is a screen shot of a product catalog or product listing screen including a shopping cart widget or program according to a further embodiment of the invention.

Turning to FIG. 11, an example of an on-line catalog 150 is shown. The on-line catalog is for use by a buyer for a retail store to purchase products for sale in the store. The buyer browses the products and selects those desired for the store. The computer used by the buyer may be an office or home computer, tablet computer, laptop computer, netbook computer, smart phone, server computer, kiosk computer, workstation, or other computer device. The catalog of the illustrated embodiment includes store identification, such as a store number and/or store address for which the buyer is buying products. A listing 154 of product categories is provided from which the user may select a category. Within each category are one or more products that can be reviewed and ordered by the user. The products are shown at 156 in product listings that include a picture of the product, a description, pricing information and other information that may be useful to the buyer. Products may be located by searching within the categories 154 or by searching using a search window 158 or by other locating means.

As products are identified for ordering, they are placed into a shopping cart 160 (a virtual shopping cart). The shopping cart 160 is shown on the catalog page 150 as a symbol or widget. More than one shopping cart 160 can be created by the user. In a preferred embodiment, the shopping cart widget 160 is displayed on all pages within the on-line catalog and allows users to create and control up to 200 different shopping carts.

An order for a retail store may take several days to prepare before it is submitted for purchase and delivery. Retailers, or more precisely, the buyers for the retailers, often create special orders for customers for an item that the customer wishes to have the item immediately. If the regular store order is being prepared and is not yet complete then submitting the special order though the store ordering system could be a problem. With the possibility for multiple shopping carts that are controlled individually, the buyer is able to add items to a shopping cart for a specific customer and to control that cart, and therefore that order, without interfering with the ordering process for items to be ordered for the store in the regular course of business or to interfere with items ordered for other customers.

The shopping cart widget 160 lets a user create and name a plurality of carts, view items within each cart, determine whether the cart contents (the order) should be shipped directly to the customer, such as via an express courier or a delivery, or whether the order should be delivered on the regular truck for delivery to the store or an express delivery to the store. Other delivery arrangements are also possible. Items may be moved from one cart to another and a purchase order number may be assigned at the cart level. The purchase order number will flow through the billing system and will be included on the invoice to the store and on the receiving documents.

Users may set up alerts to remind them that a shopping cart has not yet been submitted to the order system. In this way, a shopping cart containing an incomplete or un-submitted order is not forgotten.

Figure 12:
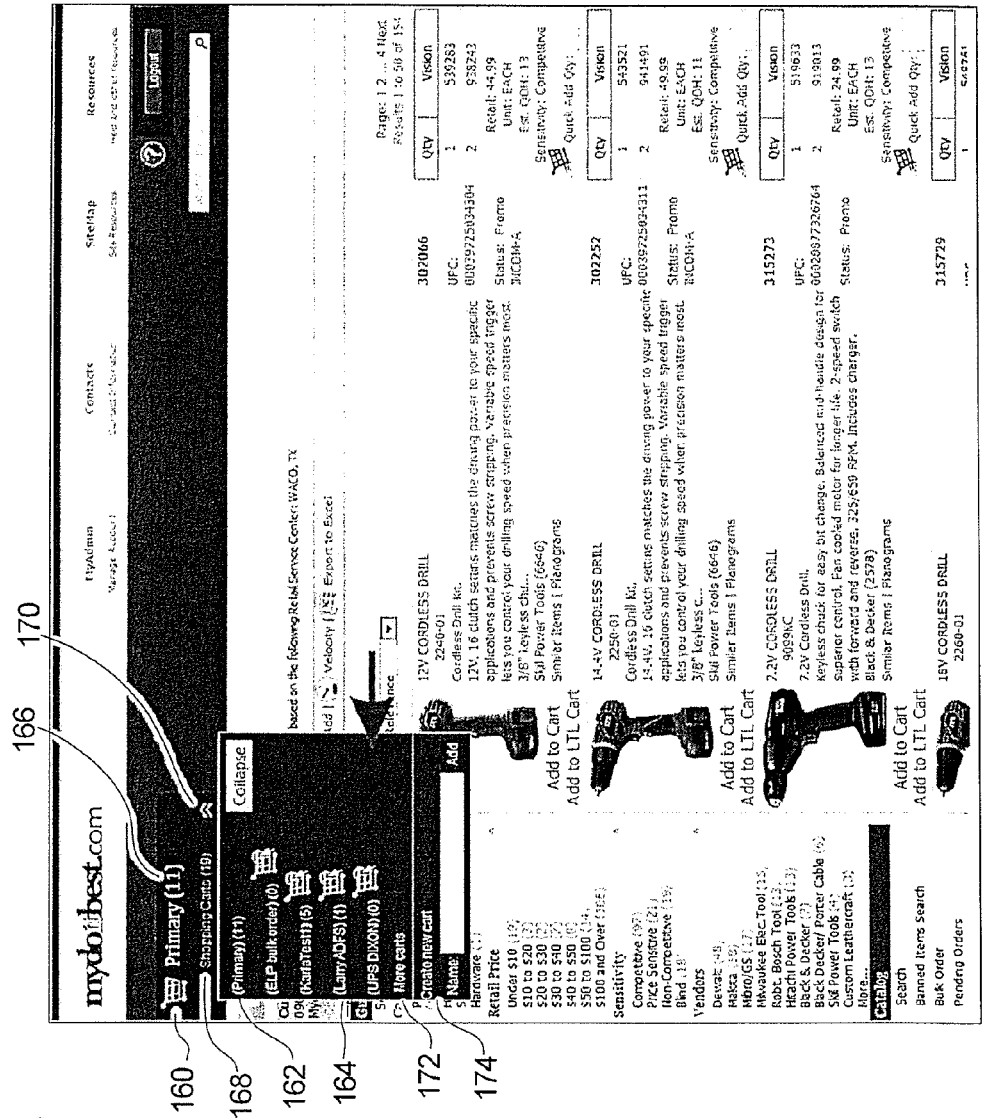
FIG. 12 is a screen shot of a shopping cart selection menu.

In FIG. 12, the user has clicked on or otherwise selected the shopping cart widget or icon 160, resulting in a pull down menu 162 being displayed on which appears a listing of the shopping carts 164 available. The user can select one of the shopping carts 164 within the list 162 by moving the computer pointer to the desired cart. The selected cart may be identified within the cart widget with a distinctive color or highlight. A number 166 is displayed in parenthesis, in this case 11, which indicates how many items are currently in the selected shopping cart. The total number of carts that have been created is shown at 168. In this example, there are 19 carts that are in use by this user. By clicking a chevron symbol 170, the cart widget list will expand and show the favorite carts of the user. Up to five carts may be designated by the user as favorite carts. If a desired cart is not one of the listed favorites, a more carts link 172 may be clicked to view all of the carts.

The widget drop down menu 162 also allows the user to create a new cart at 174. The user enters a desired name for the new shopping cart and clicks the add link, resulting in the new cart being added to the listing. Carts may be named any name that is meaningful to the user. Employee or customer names may be used; sometimes stores will use department names for the carts such as "plumbing" or "electrical" to indicate these carts are for use by a department manager.

Figure 13:
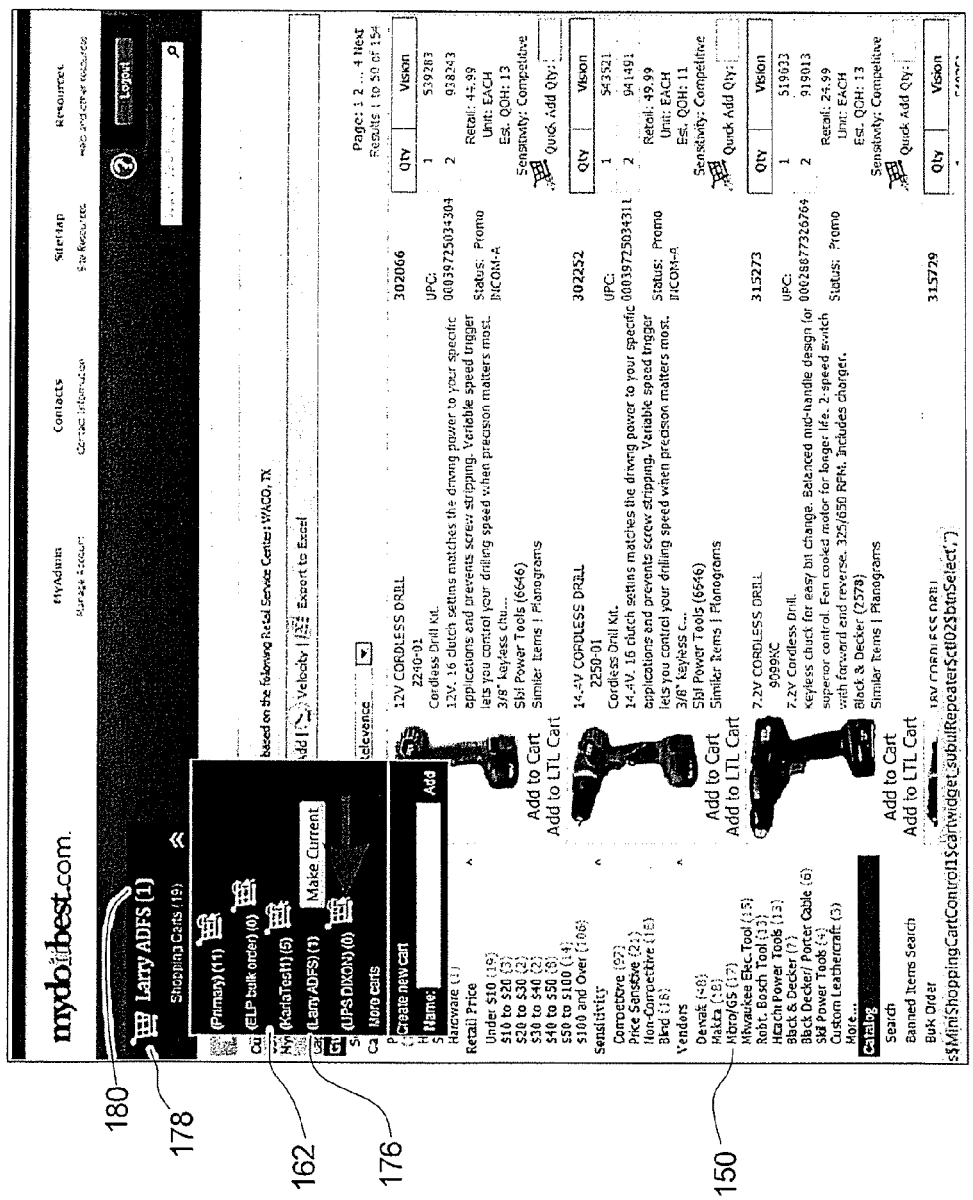
FIG. 13 is a screen shot of showing an identification of a current shopping cart for receiving orders.

With reference to FIG. 13, only one cart may be the current cart 176 in the widget. The current cart 176 is the one to which all items will be added when an item in the catalog 150 is added to a cart by the user. Users may switch to any cart desired as the current cart while creating the order. To make a cart the current cart, the user must click on a shopping cart icon next to the cart name, which will cause the designation "current cart" 176 to appear on the list 162 and the name of the current cart to appear at the top 178 of the shopping cart display. A number in parentheses 180 is provided next to the cart icon that indicates how many items are in that cart. The number of items may be indicated next to only the current cart, next to each of the favorite carts, or next to all carts.

When the order in a cart is finalized, the cart must be submitted using a submit cart link. This allows the order to be filled and delivered as specified by the delivery instructions associated with the cart.

Figure 14:
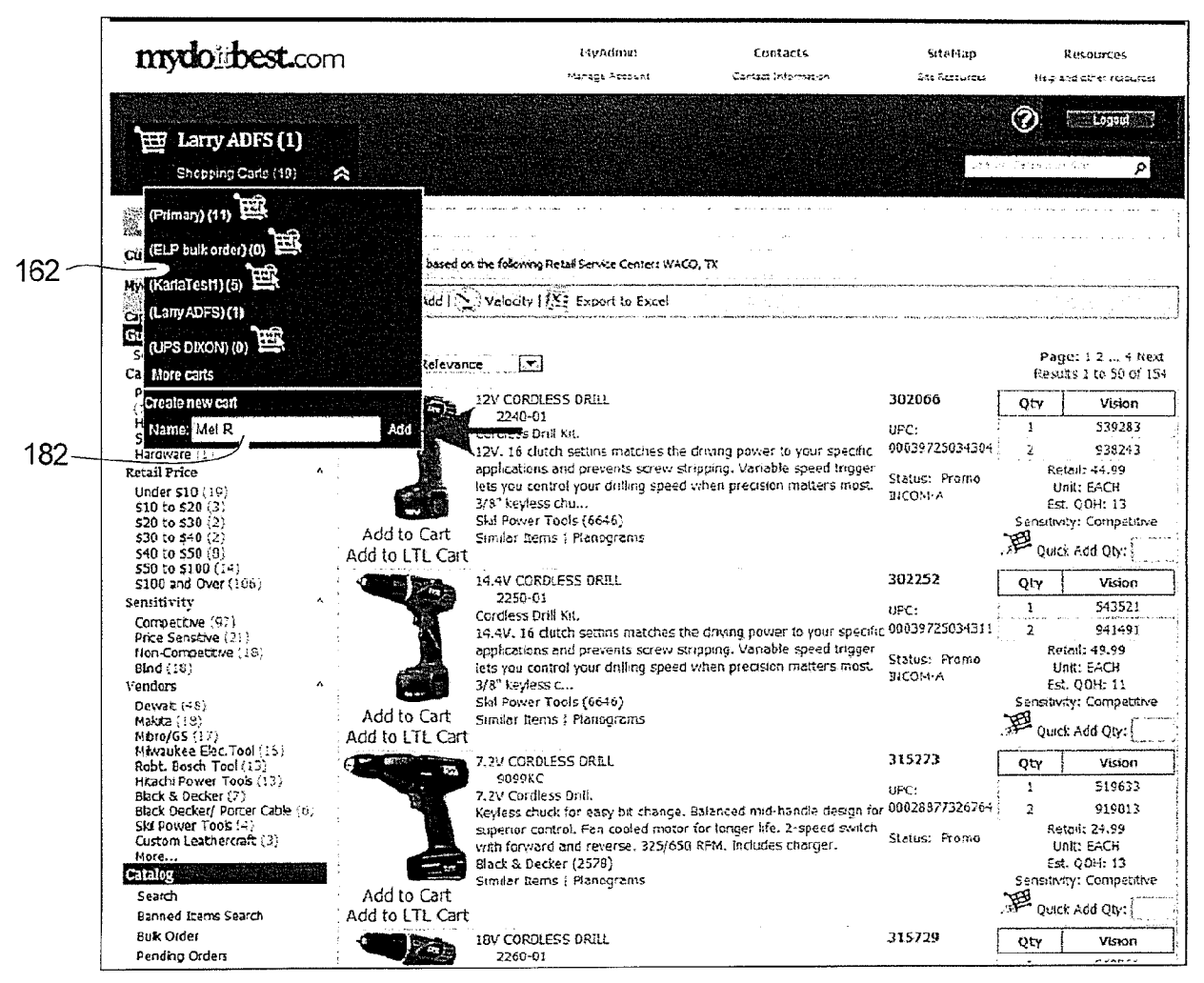

In FIG. 14, a new cart is being created using the widget. The user simply enters a name of the new cart in the name entry box 182 provided in the create new cart portion 174 of the pull down menu 162. The new cart that is created will the default settings, including the default settings for shipping wherein the ordered is shipped from the store's retail service center (warehouse), but the user may edit the cart settings and change the shipping instructions to a delivery service shopping cart. If a delivery service cart is desired, the user may then select any of the eight, for example, retail service centers available. Products will be shipped from the selected retail service center or distribution center. Alternately, the items may be shipped directly from the vendor. Settings for each shopping cart may be accessed by a shopping cart menu, for example, that is accessed by double clicking or right-clicking on the desired shopping cart, or otherwise accessing the settings menu.

Figure 15:
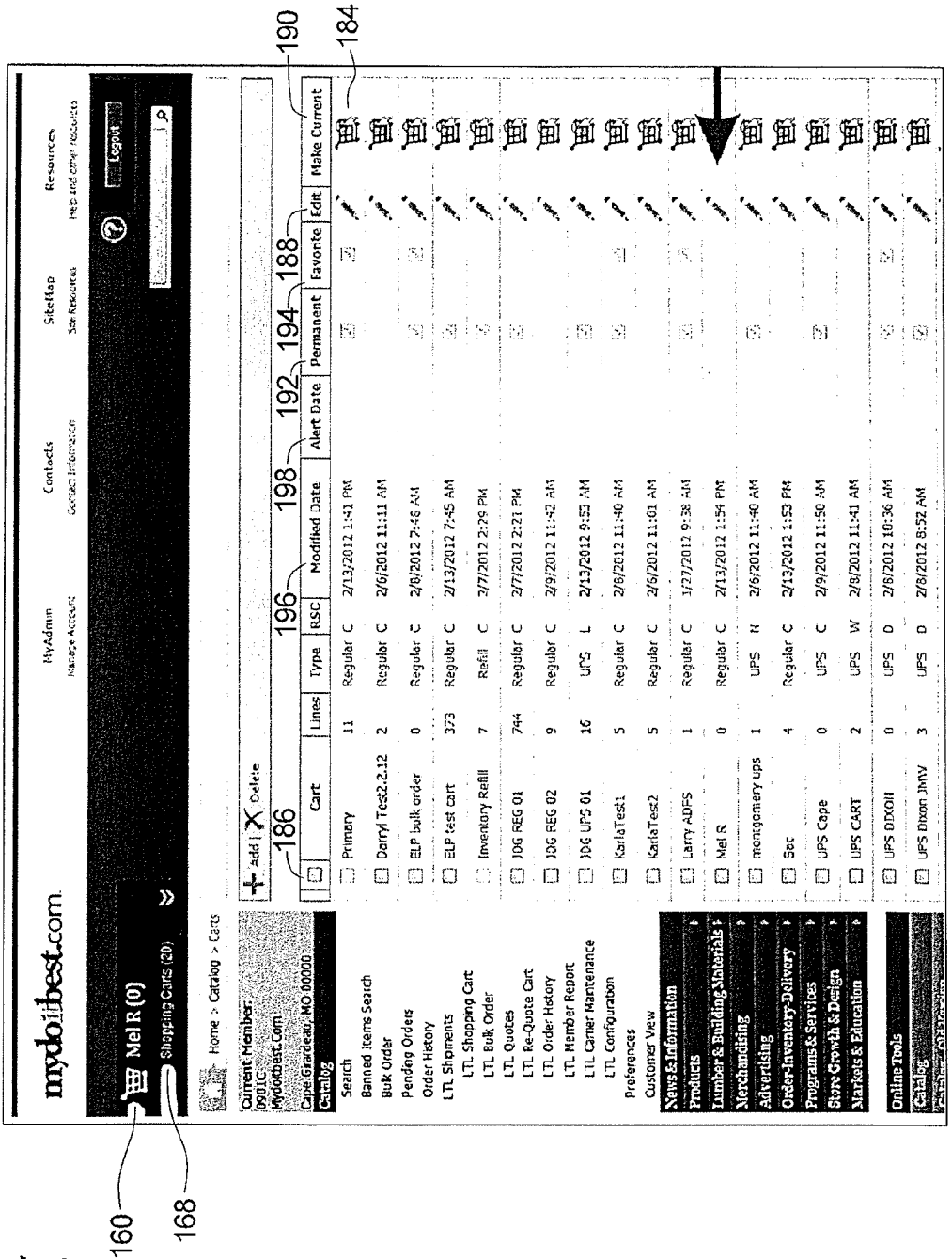
FIG. 15 is a screen shot of a listing of shopping carts currently available to the user.

FIG. 15 reveals how a user can review the contents of each shopping cart. Clicking on the shopping carts link 168 in the cart widget 160 will display a list 184 of all of the shopping carts that have been created. On this page 184, the user may add or delete carts 186, edit the carts 188, choose a cart to be the current cart 190, make a cart permanent 192 or designate it as a favorite 194. Shipping instructions for each shopping cart are indicated in a column, as are alerts, RSC, and the number of items or lines in each cart.

The shopping cart listing 184 on this page may be sorted by clicking on any of the column headings 196. The user is thereby able to locate shopping cart easily. When a user selects or clicks on the cart name, the listing 184 will show all of the items contained in the cart.

A user may wish to retain a cart and its name after the order has been submitted. The system therefore retains the named carts after the order has been submitted and the cart contents zeroed. For example, if the electrical department of the retail store places orders every week, the cart for the electrical department will continue to exist in the shopping cart system after the order is submitted but without the items that were in the cart but which have already been submitted as an order. In other cases, such as a special order of one or a few items for a customer, the user may wish to create a cart for that customer and then delete the cart after the order is submitted. By checking the indication "permanent" the cart remains in the system after an order submittal, but by not checking the indication "permanent" the cart will automatically be deleted after the order is submitted.

The list 184 includes an alert column 198, which if set to a predetermined date by the user or by default, will highlight the corresponding cart after the deadline date has passed, and an alert icon will appear in the widget 160.

Figure 16:
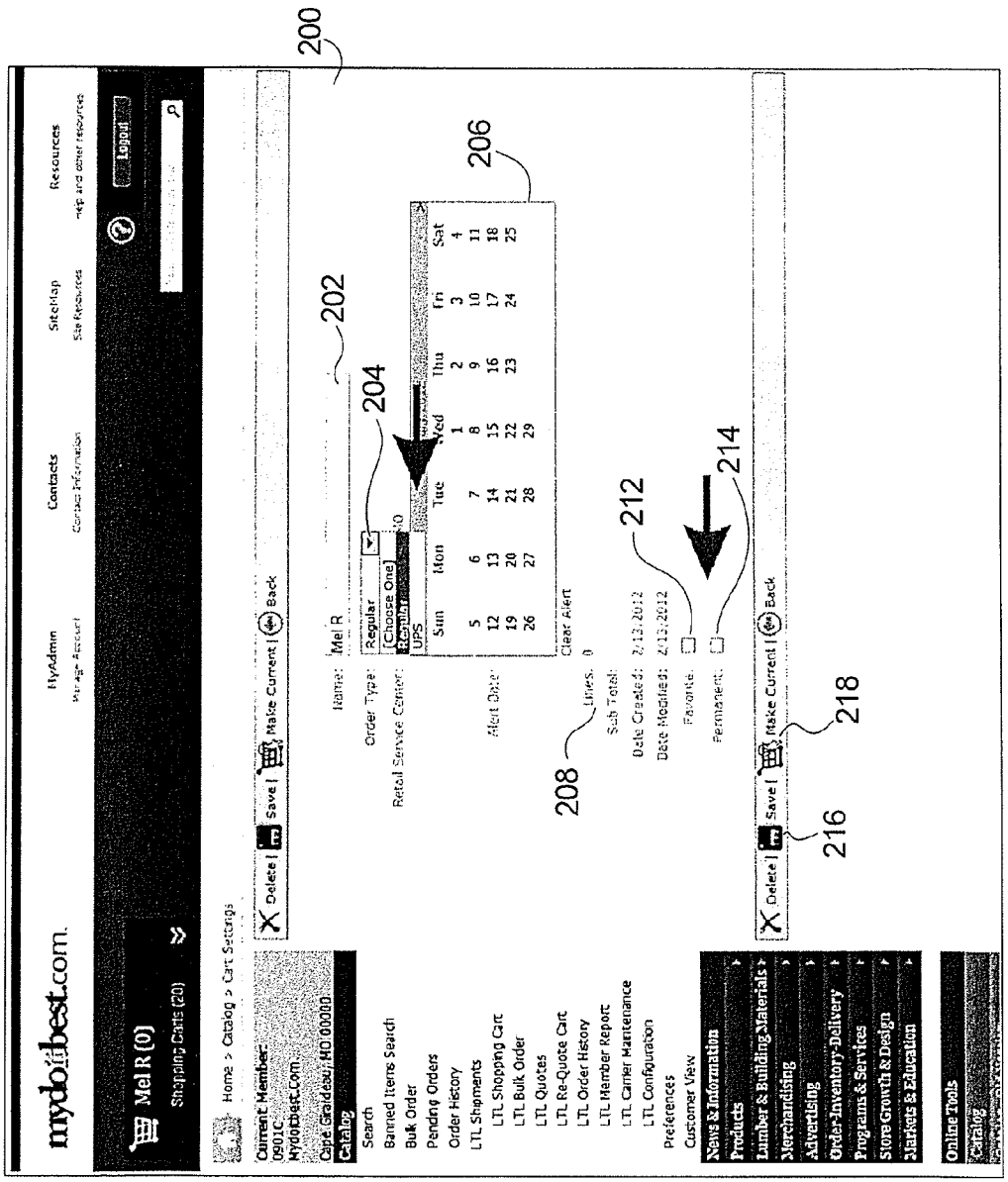
FIG. 16 is a screen shot of a shopping cart attributes being edited.

FIG. 16 illustrates operation of the present system as used to edit the carts, for example to change their attributes. On this screen 200, the cart name 202 may be changed, and the order type 204 changed from regular (a warehouse shipment) to a courier service, such as UPS delivery. If the courier service is selected as the order type, the user may also select from the available retail service centers to ship the items, as may be selected by a menu.

Using a calendar function 206, an alert may be set to remind the user to submit the cart before the order deadline. The number of different products in the shopping cart is displayed, here indicated as the number of lines 208 to distinguish from multiples of the same item. For example, an order for four drills, eight wrenches, and seven paint brushes would show up as three lines or types of items rather than as 19 items. Date information for when the shopping cart was created and when modified is shown.

The user may indicate the selected shopping cart as a favorite cart by selecting the favorite box 212 will cause the cart to show up as one of the five favorites in the widget pull down menu 162. If the permanent box 214 is checked, this will cause the cart to be retained after the order is submitted. When the cart is designated as permanent, items in the cart will be removed after the order is sent, but the name of the cart and its settings will be saved. The setting changes can be saved at 216, and the displayed cart can be made the current cart for accepting items in the order at 218.

Figure 17:
FIG. 17 is a screen shot showing the items in a selected shopping cart.

FIG. 17 shows a list 220 of the items in a cart. By clicking on the cart name, all of the items contained in the cart will be displayed in the list 220. The user may click on the item name 222 in the list 220 to view the item in the catalog, or clicking on the image icon 224, the system will display an image of the item. Items may also be added or deleted using this page 220. The quantity of an item may be changed by clicking the on an edit icon 226.

No purchase order is necessary to submit the order in the shopping cart, but one may be added if desired, such as by entering the purchase order information in box 228. The purchase order number (or name) will appear on the item invoice and receiving document when the item is shipped.

A user may enter an email address in box 230 if an order confirmation is desired by email. Orders may also be verified by clicking on the pending orders link which shows items that have been submitted and that are on order.

Figure 18:
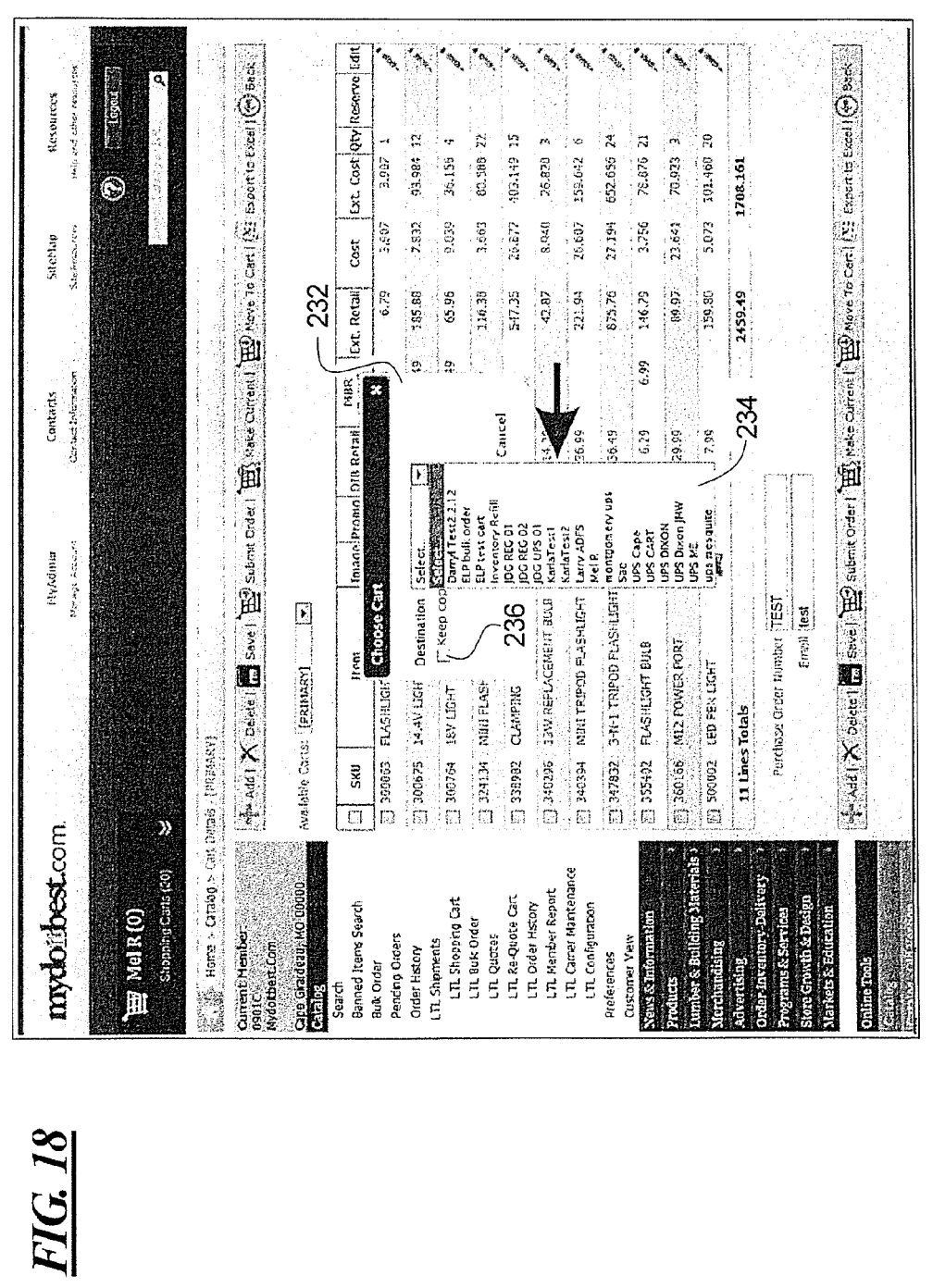

Turning now to FIG. 18, selected items may be moved from one cart to another by checking the box near each item and selecting the move to cart button at the top of the menu that appears. A pop-up window 232 appears in which the user may select which to cart to move items, such as from a pull-down menu 234. This may be particularly useful if the user wishes to move selected items to a cart that can be sent via a delivery service, for example. The user may desire to keep a copy of the items moved from the cart by selecting a box 236.

Figure 19:
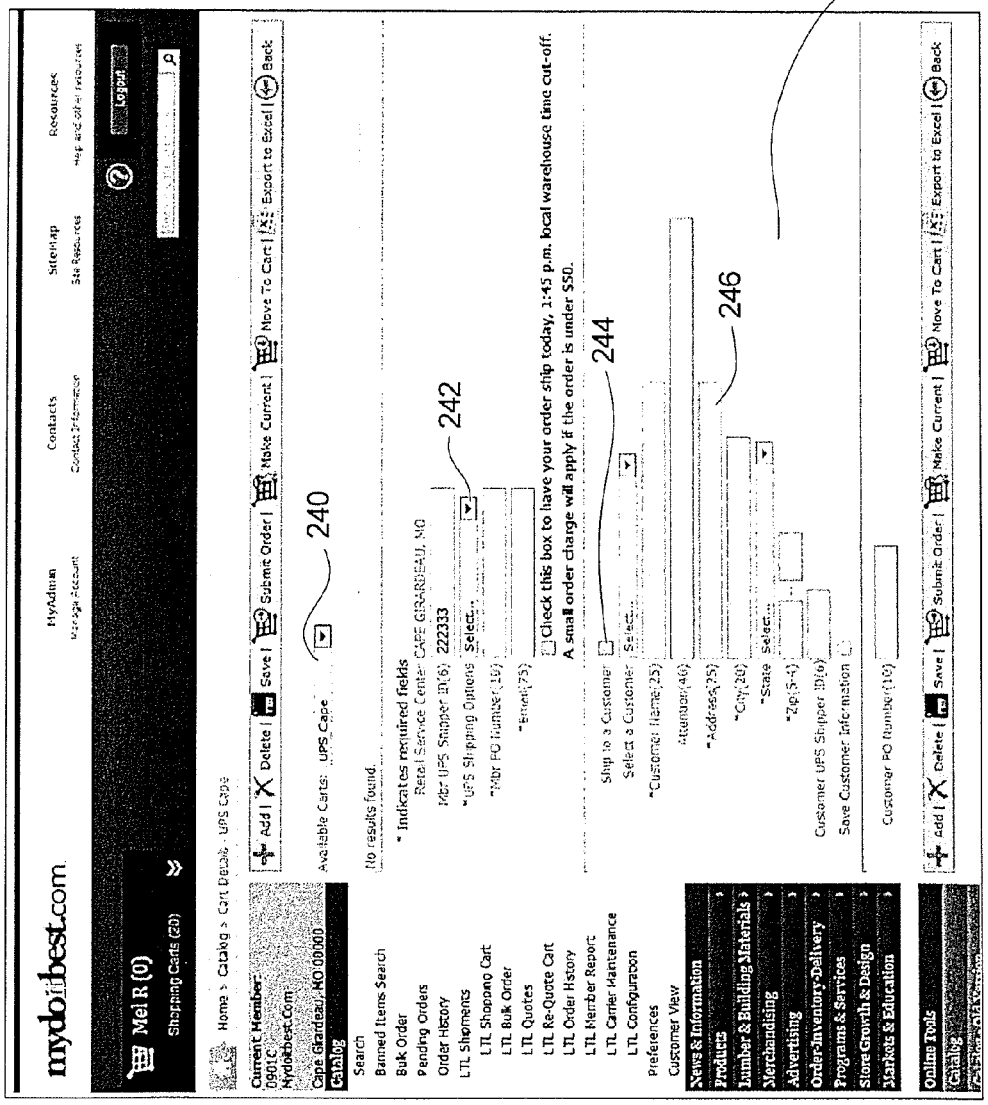
FIG. 19 is a screen shot showing a user entry screen for order information to order items in a shopping cart.

FIG. 19 illustrates the entry screen 238 for designating delivery and shipping for the order. When the cart order type is set to a delivery service 240, such as UPS, the user may select the shipping options 242 desired. The delivery options 242 include next day delivery, second day deliver, or standard delivery. The order may be sent to the store or by selecting the box 244 shipped directly to the customer if desired. If the item is to be shipped to the customer, the customer information should be entered at spaces 246 on this screen for items going to the customer's address.

Thus, there is shown and described a computer application for ordering items for a retail store and a shopping cart widget by which items ordered for a retail store may be ordered at different times and with different conditions or for different departments or recipients. The system and method according to the present invention can be used for orders other than for items to be provided to a retail store, however. For instance, users buying supplies for a business may desire to use multiple shopping carts to organize orders, to ship different orders to different business locations, or for other reasons. Attendees at a trade show may find it helpful to have a tablet computer or other electronic device with an application that organizes and presents information related to attendees at the trade show. The trade show attendee may desire to have multiple shopping carts available while placing orders during the trade show. Shoppers at on-line shopping sites may also use the multiple shopping cart feature of the present invention.

The buyers at the buyer show need not all be buyers for the same co-operative, but may be buyers within the same industry. For example, a fashion or clothing industry show may features buyers from retail stores under many different store names who are buying products for their stores. Electronics shows, game software shows, and many other shows may benefit from the present system and method.

Although other modifications and changes may be suggested by those skilled in the art, it is the intention of the inventors to embody within the patent warranted hereon all changes and modifications as reasonably and properly come within the scope of their contribution to the art.

We claim:

1. A method for ordering items from an electronic catalog, comprising the steps of:
   displaying a catalog of items for order on a display of a computer device having a processor;
   running a shopping cart program on the computer device, said shopping cart programming running without requiring an internet browser program and without requiring an active communication channel to a network;
   displaying on the computer device a plurality of shopping carts by the shopping cart program;
   receiving on the computer device order information from a first user for an item in the catalog as a first ordered item;
   storing on the computer device the order information for the first ordered item in a first shopping cart of the plurality of shopping carts;
   receiving on the computer device order information from a second user for an item in the catalog as a second ordered item;
   storing on the computer device the order information for the second ordered item in the first shopping cart with the first ordered item;
   receiving on the computer device order information for an item in the catalog as a third ordered item;
   storing on the computer device the order information for the third ordered item in a second shopping cart of the plurality of shopping carts;
   receiving a command to designate at least one of the shopping carts as a permanent shopping cart, the shopping cart designated as a permanent shopping cart remains on the display after items assigned to the permanent shopping cart are submitted for order;
   receiving a command to designate at least one of the shopping carts as a temporary shopping cart, the shopping cart designated as a temporary shopping cart being removed from the display after items assigned to the temporary shopping cart are submitted for order; and
   submitting by the computer device the order information of ordered items in at least one of the shopping carts to an order entity as a submitted order.

2. A method as claimed in claim 1, wherein said plurality of shopping carts are designated for shipping the ordered items according to a plurality of different shipping channels or destinations.

3. A method as claimed in claim 1, wherein said plurality of shopping carts are designated for orders of items to be provided to a retail outlet, and said step of receiving orders from said first and second users include receiving orders for items for the retail outlet.

4. A method as claimed in claim 1, further comprising:
receiving orders of items from a plurality of authorized users as ordered items, the ordered items being assigned to ones of the plurality of shopping carts by the authorized users, the plurality of authorized users being employees of a retail outlet and the orders being items for stocking in the retail outlet.

5. A method as claimed in claim 1, wherein said shopping cart program is an app that is running on the computer device, said app displaying items in the shopping carts while operating in off-line mode, the app operating according to the principles of service oriented architecture.

6. A method as claimed in claim 1, wherein said plurality of shopping carts include shopping carts designated for different respective methods of shipping for items ordered in the respective shopping cart.

7. A method as claimed in claim 1, further comprising:
receiving a command to at least one of edit and combine orders in the shopping carts by the first user regardless of whether the items assigned to the shopping cart were added by the first user or the second user.

8. A method as claimed in claim 1, wherein said plurality of shopping carts include shopping carts designated for different respective departments of the retail outlet.

9. A method as claimed in claim 1, wherein said plurality of shopping carts include shopping carts designated for different respective customers of the retail outlet.

10. A method as claimed in claim 1, further comprising the step of:
maintaining a plurality of shopping carts on the display as the user examines the catalog for items to order.

11. A method as claimed in claim 1, wherein the display show only a shopping cart widget until the shopping cart widget is selected by a user, and
displaying a plurality of shopping carts upon selection of the shopping cart widget by the user.

12. A method as claimed in claim 1, further comprising the steps of:
alerting a user that one or more of the shopping carts contains items and that the items have remained unordered in the shopping cart for a predetermined period of time.

13. A method for ordering items from an electronic catalog, comprising the steps of:
displaying a catalog of items for order on a display of a computer device having a processor;
running a shopping cart program on the computer device to display a plurality of shopping carts, the shopping cart program being capable of running in stand-alone mode to display items in the shopping carts without a browser program running and without an active network connection;
receiving on the computer device order information from a first user for an item in the catalog as a first ordered item;
storing on the computer device the order information for the first ordered item in a first shopping cart of the plurality of shopping carts;
receiving on the computer device order information from a second user for an item in the catalog as a second ordered item;
storing on the computer device the order information for the second ordered item in the first shopping cart with the first ordered item;
receiving orders of items from a plurality of authorized users as ordered items, the ordered items being assigned to ones of the plurality of shopping carts by the authorized users, the plurality of authorized users being employees of a retail outlet and the orders being items for stocking in the retail outlet;
maintaining on the computer device ordered items in ones of the shopping carts as unsubmitted order items after the submittal of the order from the selected shopping cart;
receiving a command to designate at least one of the shopping carts as a permanent shopping cart, the shopping cart designated as a permanent shopping cart remains on the display after items assigned to the permanent shopping cart are submitted for order;
receiving a command to designate at least one of the shopping carts as a temporary shopping cart, the shopping cart designated as a temporary shopping cart being removed from the display after items assigned to the temporary shopping cart are submitted for order;
receiving a command to at least one of edit and combine orders in the shopping carts by the first user regardless of whether the items assigned to the shopping cart were added by the first user or the second user; and
submitting by the computer device the order information of ordered items in at least one of the shopping carts to an order entity as a submitted order.

* * * * *